United States Patent
Clewes et al.

(10) Patent No.: US 11,281,828 B1
(45) Date of Patent: *Mar. 22, 2022

(54) AUTOMATED ANALOG LAYOUT

(71) Applicant: Pulsic Limited, Bristol (GB)

(72) Inventors: Paul Clewes, Northumberland (GB); Liang Gao, Gateshead (GB); Jonathan Longrigg, Newcastle upon Tyne (GB)

(73) Assignee: Pulsic Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,937

(22) Filed: Sep. 22, 2020

Related U.S. Application Data

(63) Continuation of application No. 15/162,458, filed on May 23, 2016, now Pat. No. 10,783,292.

(60) Provisional application No. 62/165,102, filed on May 21, 2015.

(51) Int. Cl.
*G06F 30/327* (2020.01)
*G06F 30/394* (2020.01)
*G06F 30/392* (2020.01)
*G06F 111/12* (2020.01)

(52) U.S. Cl.
CPC .......... *G06F 30/327* (2020.01); *G06F 30/392* (2020.01); *G06F 30/394* (2020.01); *G06F 2111/12* (2020.01)

(58) Field of Classification Search
CPC ............... G06F 17/505; G06F 17/5072; G06F 17/5077; G06F 30/327; G06F 30/392; G06F 30/394; G06F 2111/12
USPC .... 716/139, 102, 103, 118, 136; 703/14, 15, 703/16
See application file for complete search history.

(56) References Cited

U.S. PATENT DOCUMENTS

| | | |
|---|---|---|
| 5,815,402 A | 9/1998 | Taylor et al. |
| 6,189,134 B1 | 2/2001 | Weber |
| 6,574,779 B2 | 6/2003 | Allen et al. |
| 7,191,423 B1 | 3/2007 | Sze |
| 7,418,683 B1 | 8/2008 | Sonnard et al. |
| 8,826,211 B1 | 9/2014 | Sood et al. |
| 10,268,797 B2 | 4/2019 | McElvain et al. |
| 10,783,292 B1* | 9/2020 | Clewes ................. G06F 30/327 |
| 2002/0194575 A1 | 12/2002 | Allen et al. |
| 2004/0103384 A1 | 5/2004 | Tanaka |
| 2005/0268269 A1 | 12/2005 | Coiley |
| 2007/0022399 A1 | 1/2007 | Tsai et al. |
| 2007/0164785 A1 | 7/2007 | He |
| 2008/0092099 A1 | 4/2008 | Lin et al. |
| 2009/0031277 A1 | 1/2009 | McElvain et al. |
| 2009/0031278 A1 | 1/2009 | McElvain et al. |

(Continued)

OTHER PUBLICATIONS

Jackey Z.Yan, Chris Chu, DeFer: Deferred Decision Making Enabled Fixed-Outline Floorplanning Algorithm, IEEE Transactions on Computer-Aided Design of Integrated Circuits and Systems, Mar. 2010, pp. 367-381, vol. 29, No. 3, United States of America.

*Primary Examiner* — Phallaka Kik
(74) *Attorney, Agent, or Firm* — Aka Chan LLP

(57) ABSTRACT

An automated analog layout tool creates not just one, but many electrically correct layouts from an input schematic. Designers can explore multiple layout options in a fraction of the time needed to produce just a single layout by hand. Because the tool produces layout results so quickly, parasitics are available for simulation early in the design process, further speeding the entire design cycle. The tool considers place and route concurrently.

20 Claims, 35 Drawing Sheets

(56) References Cited

U.S. PATENT DOCUMENTS

| | | |
|---|---|---|
| 2009/0235219 A1 | 9/2009 | Lin et al. |
| 2010/0306720 A1 | 12/2010 | Pikus et al. |
| 2011/0040548 A1 | 2/2011 | Khalily et al. |
| 2011/0042818 A1 | 2/2011 | Liao |
| 2011/0107281 A1 | 5/2011 | Sun et al. |
| 2012/0023465 A1 | 1/2012 | Gopalakrishnan et al. |
| 2013/0074028 A1 | 3/2013 | Blatchford |
| 2013/0086542 A1 | 4/2013 | Teoh et al. |
| 2013/0125072 A1 | 5/2013 | Newcomb |
| 2013/0179848 A1 | 7/2013 | Liu et al. |
| 2013/0219150 A1 | 8/2013 | Anderson et al. |
| 2013/0334610 A1 | 12/2013 | Moroz et al. |
| 2015/0269297 A1 | 9/2015 | Tuan |
| 2016/0125115 A1 | 5/2016 | Strang et al. |

\* cited by examiner

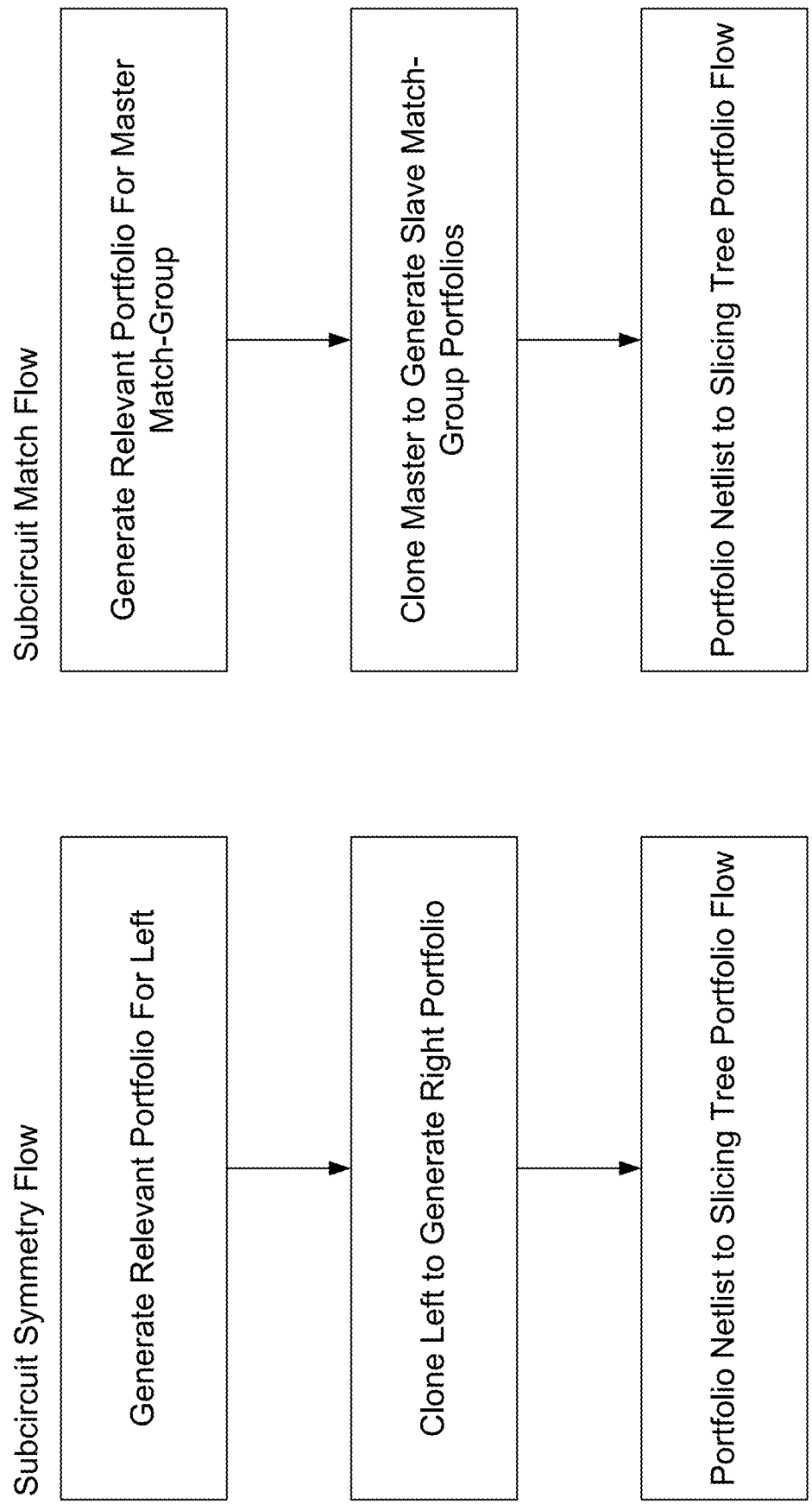

Iteration 3

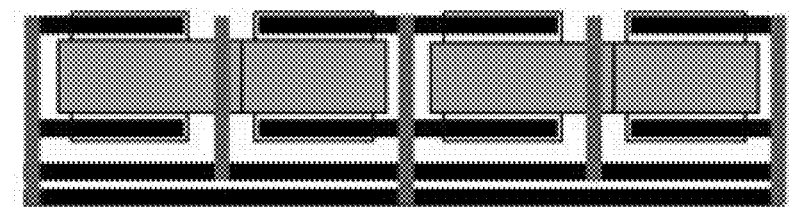
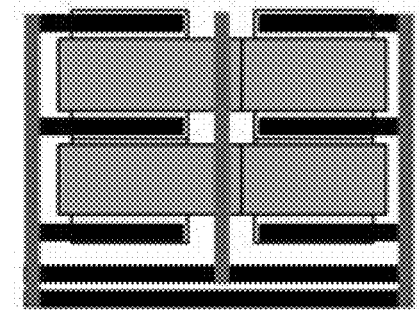
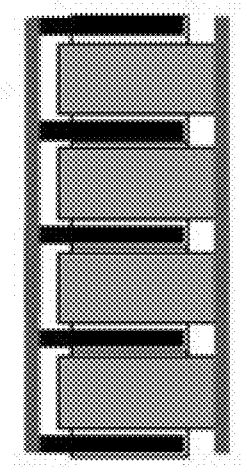
Figure 28

Figure 31A
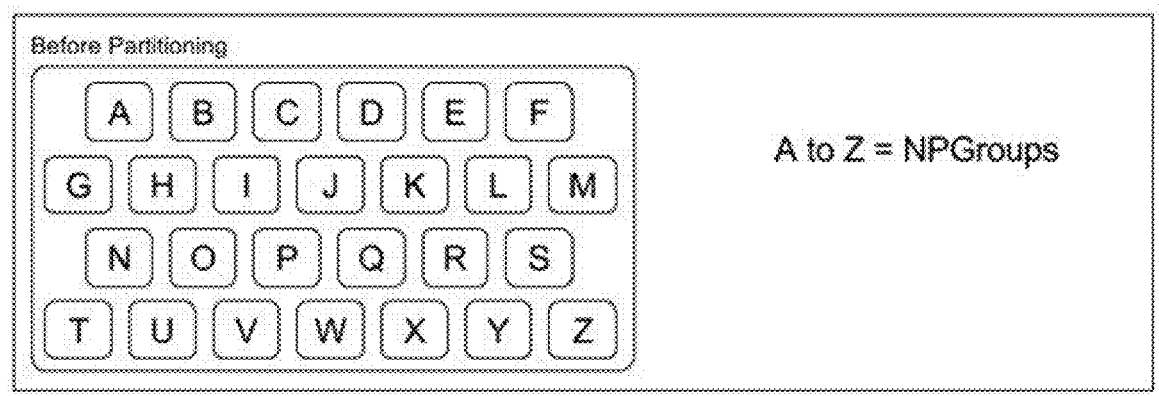
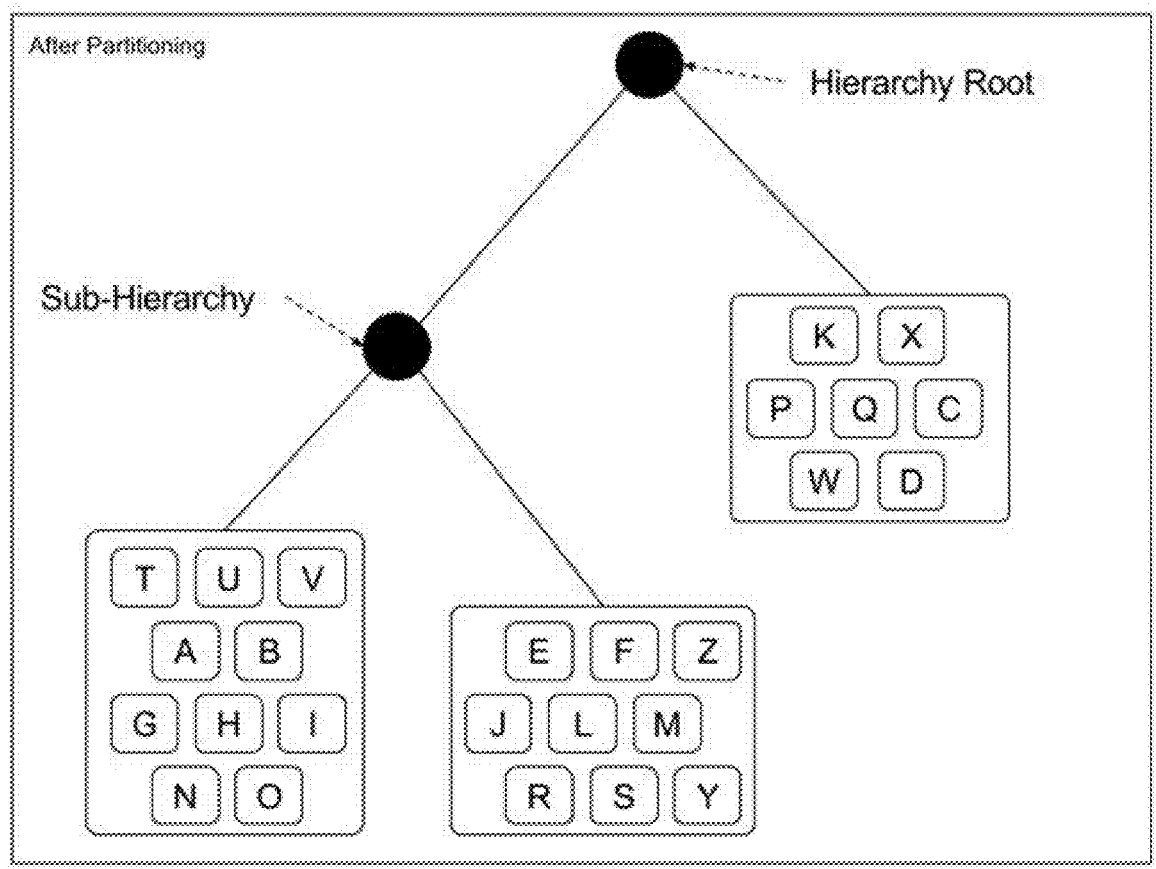
Figure 31B

AUTOMATED ANALOG LAYOUT

CROSS-REFERENCE TO RELATED APPLICATIONS

This patent application is a continuation of U.S. patent application Ser. No. 15/162,458, filed May 23, 2016, which claims priority to U.S. patent application 62/165,102, filed May 21, 2015. These applications are incorporated by reference along with all other references cited in this application.

BACKGROUND OF THE INVENTION

The present invention relates to the field of electronic design automation for integrated circuits, and in particular, to analog design automation.

Integrated circuits are important building blocks of the information age and are critical to the information age, affecting every industry including financial, banking, legal, military, high technology, transportation, telephony, oil, medical, drug, food, agriculture, education, and many others. Integrated circuits such as DSPs, amplifiers, voltage converters, DRAMs, SRAMs, EPROMs, EEPROMs, Flash memories, microprocessors, ASICs, and programmable logic are used in many applications such as computers, networking, telecommunications, and consumer electronics.

Consumers continue to demand greater performance in their electronic products. For example, higher speed computers will provide higher speed graphics for multimedia applications or development. Higher speed internet web servers will lead to greater on-line commerce including on-line stock trading, book sales, auctions, and grocery shopping, just to name a few examples. Higher performance integrated circuits will improve the performance of the products in which they are incorporated.

Large modern day integrated circuits have millions of devices including gates and transistors and are very complex. As process technology improves, more and more devices may be fabricated on a single integrated circuit, so integrated circuits will continue to become even more complex with time. To meet the challenges of building more complex and higher performance integrated circuits, software tools are used. These tools are in an area commonly referred to as computer aided design (CAD), computer aided engineering (CAE), or electronic design automation (EDA). There is a constant need to improve these electronic automatic tools in order to address the desire to for higher integration and better performance in integrated circuits.

An integrated circuit may be specified using a netlist and a layout. The netlist provides information about devices or components of the integrated circuit and their connectivity. The integrated circuit layout or integrated circuit mask layout is the representation of an integrated circuit in terms of planar geometric shapes, patterns, and features that correspond to shapes used in a mask to fabricate the circuit. A design engineer or mask designer may create the layout the integrated circuit. Some features in the layout or certain masks may be automatically generated, such as automatic placement of elements and automatic routing of these elements.

Therefore, there is a need for improved tools for automated analog layout.

BRIEF SUMMARY OF THE INVENTION

An automated analog layout tool creates not just one, but many electrically correct layouts from an input schematic. Designers can explore multiple layout options in a fraction of the time needed to produce just a single layout by hand. Because the tool produces layout results so quickly, parasitics are available for simulation early in the design process, further speeding the entire design cycle. The tool considers place and route concurrently.

A specific implementation of an automated analog layout tool is Pulsic Animate™ by Pulsic Limited of the United Kingdom. See www.pulsic.com for more information, and all information available at this Web site is incorporated by reference. All white papers, data sheets, users guides, help screens, and other documentation, available online or in paper, for Pulsic Animate and other Pulsic products are incorporated by reference. All issued patents and published patent applications, provisional and nonprovisional, where Pulsic is an applicant or an assignee, are incorporated by reference along with all other reference cited in this application.

Some benefits of Pulsic Animate include: gets designers up to speed rapidly with minimal training and setup; reduces layout time from days or weeks to minutes; enables exploration of multiple architectures and extraction of realistic parasitics; creates manual-quality results in a fraction of the time; enables accurate simulation early in the design process; and uses native OpenAccess and PCells or PyCells.

Some features of Pulsic Animate include: easy-to-use GUI; automatic constraint recognition from schematics; unique PolyMorphic Layout technology generates multiple electrically correct layouts ranked by user-specified criteria; supports both CMOS digital (row-based) and CMOS analog (area-based) designs; and supports flat or hierarchical designs.

In an implementation, a method includes: importing a first schematic in a first format; creating a first netlist from the first schematic; storing the first netlist in a memory; using an electronic processor, automatically generating constraints for the netlist; creating a second netlist by flattening the first netlist; storing the second netlist in a memory; importing a layout in a second format; generating parameterized cells; and generating one or more placed and routed layouts to obtain a polymorphic layout.

In an implementation, a method includes: providing a graphical user interface having a first window and a second window; in the first window, displaying a first circuit schematic for a first circuit; in the second window, displaying a number of layouts for the first circuit in the first window; and providing a first layout of the layouts, where the first layout is rectangular and has an X length and Y width.

The method further provides a second layout of the layouts. The second layout is rectangular and has an X length and Y width. Relative to the first layout, structures and routing of the second layout are arranged in a mirror image of those for the first layout. The method can further provide a third layout of the layouts. The third layout is rectangular and comprises Y length and X width. The user can select one of the layouts for the first circuit (e.g., first, second, or third layouts) as a layout in an integrated circuit design including the first circuit Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 9 shows a subcircuit symmetry flow.

FIG. 10 shows a subcircuit match flow.

FIG. 28 shows a MOSFET grid portfolio and blueprints.

FIGS. 31A-31B show a row region NPGroup partitioning.

DETAILED DESCRIPTION OF THE INVENTION

Figure 1:
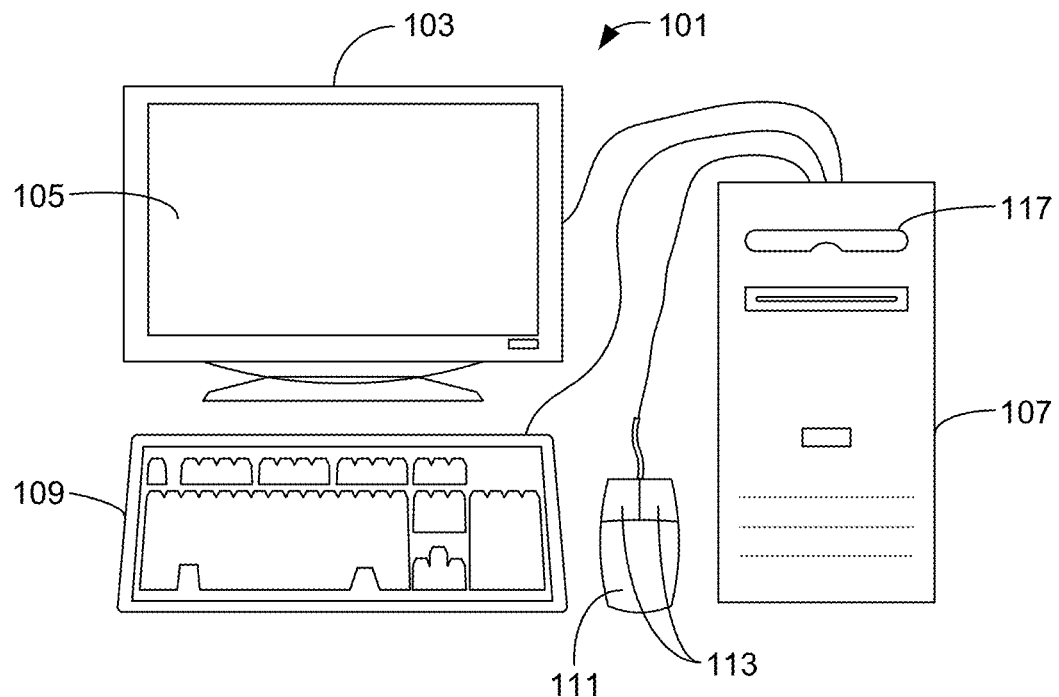
FIG. 1 shows a system of the present invention for performing electronic circuit design, including automatic simultaneous placement and routing.

FIG. 1 shows an electronic design automation (EDA) system of the present invention for designing an electronic circuit or integrated circuit, including automated analog layout. In an embodiment, the invention is software that executes on a computer workstation system, such as shown in FIG. 1. FIG. 1 shows a computer system 101 that includes a monitor 103, screen 105, enclosure 107, keyboard 109, and mouse 111. Mouse 111 may have one or more buttons such as mouse buttons 113. Enclosure 107 (may also be referred to as a system unit, cabinet, or case) houses familiar computer components, some of which are not shown, such as a processor, memory, mass storage devices 117, and the like.

Mass storage devices 117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 117. The source code of the software of the present invention may also be stored or reside on mass storage device 117 (e.g., hard disk, magnetic disk, tape, or CD-ROM). As a further example, code of the invention may be transmitted via wires, radio waves, or through a network such as the Internet.

Figure 2:
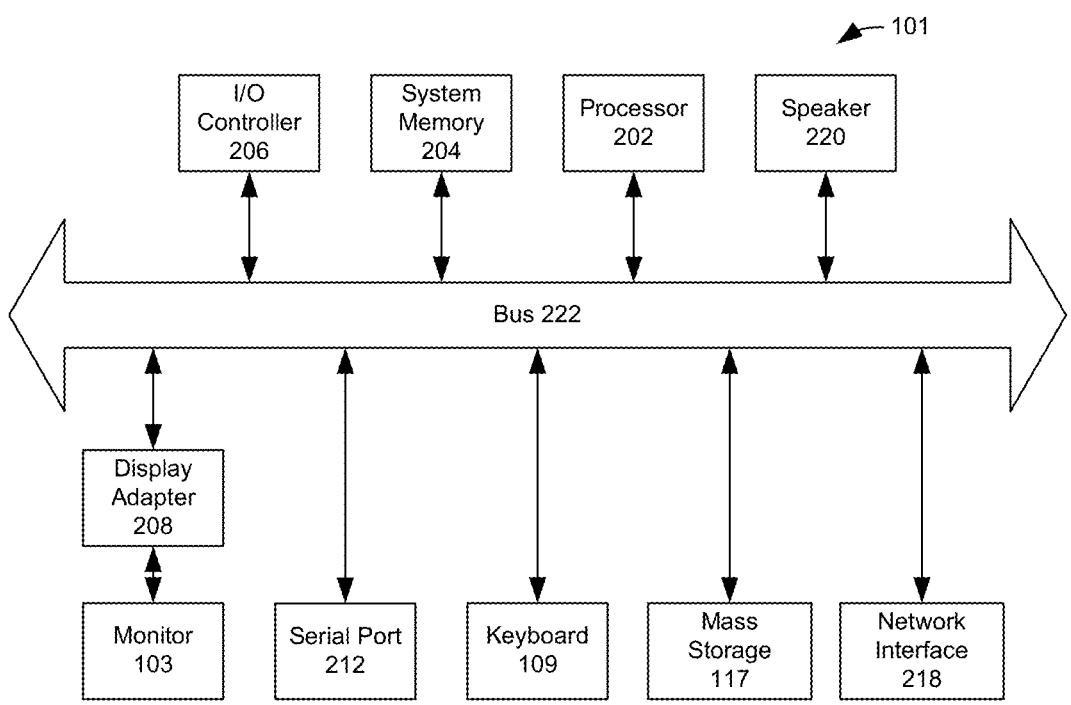
FIG. 2 shows a simplified system block diagram of computer system used in implementation of the present invention.

FIG. 2 shows a system block diagram of computer system 101 used to execute software of the present invention. As in FIG. 1, computer system 101 includes monitor 103, keyboard 109, and mass storage devices 117. Computer system 101 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 101. However, these arrows are illustrative of any interconnection scheme serving to link the subsystems. For example, speaker 220 could be connected to the other subsystems through a port or have an internal connection to central processor 202. Computer system 101 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows 8, Windows 10, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11ac, 802.11b, 802.11e, 802.11g, 802.11i, and 802.11n, just to name a few examples). For example, signals from a computer may be transferred, at least in part, wirelessly to components or other computers.

Figure 3:
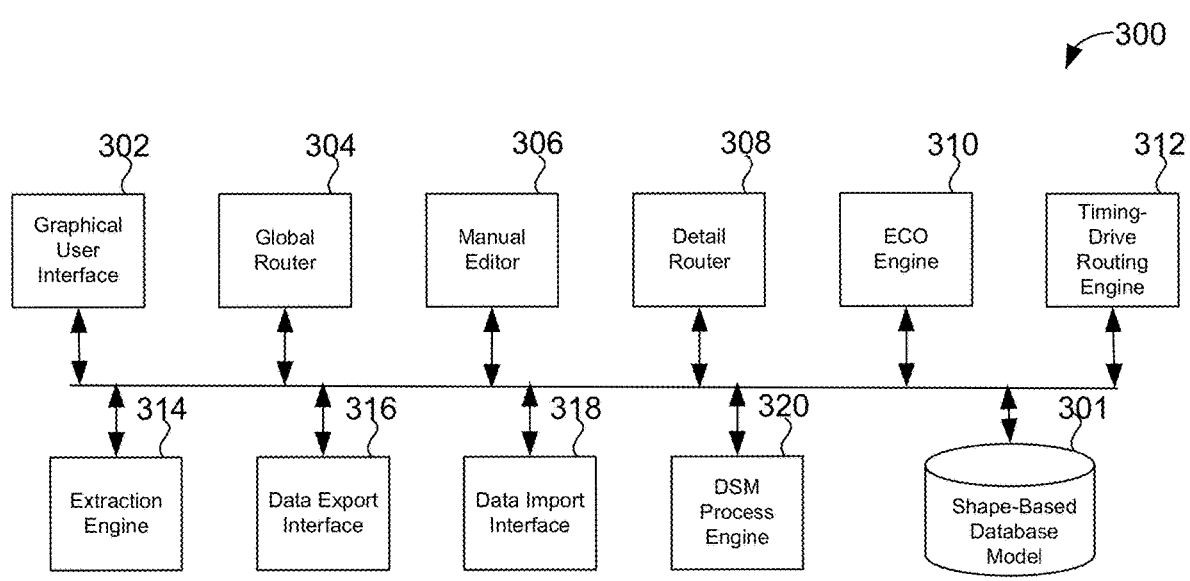
FIG. 3 shows a simplified functional block diagram of an exemplary EDA system incorporating aspects of the present invention.

FIG. 3 shows a simplified functional block diagram of an exemplary EDA system 300 incorporating aspects of the present invention. The EDA system includes a number of software tools, any of which may access a shaped-based database model 301 containing an integrated circuit design, or one or more portions of an integrated circuit design. The EDA system provides such tools as a graphical user interface 302, global router 304, manual editor 306, detail router 308, engineering change option (ECO) engine 310, timing-driven routing engine 312, extraction engine 314, data export interface 318, and DSM process engine 320. An EDA system may include any number of the system tools shown in FIG. 3, and in any combination. Further, the EDA system may include additional tools not shown in FIG. 3.

An EDA system may be a grid-based system or shape-based system. A grid-based system relies heavily on the concept of a grid and routing grids. Gridded modeling, however, becomes difficult to implement successfully as the routing and feature sizes become smaller. The amount of data increases according to a square law, which means that tasks become increasingly more computationally complex and time-consuming as the amount of data increase. As feature sizes in integrated circuits continue to shrink, more features or geometries may be fitted into the same unit area of an integrated circuit. Therefore, it is important for an EDA system to handle increasingly complex integrated circuits and provide output or results quickly.

The techniques of the invention are especially suited for a shaped-based system, which may also be referred to as a gridless system. A shape-based system has no defined cell size. Each cell, or expansion area, is as large as possible. In brief, a shape-based system can expand edges, which means that an edge of an enclosing rectangle (or other polygon) may be expanded in the direction of the edge as far as desired until the edge finds an obstacle. This may be referred to as a "flood" operation.

The shape may be representative of any polygon. For example, the shape may be a rectangle. The shape may be representative of any polygon of the integrated circuit, such as a net, contact, via, transistor gate, or transistor active area. Blocked edges are edges that cannot be extended because they are blocked by a perimeter of another rectangle, such as another segment, net, or obstacle. Once an obstacle is encountered, then a shape-based approach floods around the obstacle—making a ninety degree or other angle (any angle may be used such as 30 degrees, 35 degrees, 36 degrees, 42 degrees, 45 degrees, or 60 degrees) turns as needed to route around the obstacle.

Chip design, be it analog, custom or digital, will increasingly suffer from timing and signal integrity issues, and in particular crosstalk, as geometries continue to decrease and ever more fine wires are introduced. Gridded solutions are not flexible enough to resolve these issues, let alone achieve a high rate of routing completion. A high performance timing and crosstalk-driven routing solution will become a mandatory requirement in physical design.

The grid-based approach offers fast routing but requires customization to handle off-grid connections and is inefficient for post-route timing and signal integrity optimizations. When net widths and spacings must be changed to reduce resistance or cross-talk, grid-based approaches waste space by moving nets to the next available grid and waste time by resorting to rip-up and re-route techniques. Gridded systems are not good at irregular intervals, irregular spacings, or routing things that do not fit onto a regular grid.

The gridless approach easily handles off-grid connections and is efficient for post-route optimizations. In a shape-based or gridless system, the layout may be a gridless layout, which means there is no grid which structures or polygon of the layout are associated with, other than a grid for the relevant manufacturing process, if any.

In an embodiment, the structure of database 301 facilitates shape-based operations. For example, a structure of this database may include an obstacle tree having nodes and leaves containing the obstacles of an integrated circuit. This tree structure permits rapid determination of where obstacles are when doing operations on the database, such as routing nets.

In FIG. 3, the EDA system 300 includes one or more of the components discussed below, in any combination. One skilled in the art will recognize that one or more of components shown in FIG. 3 may not be required to practice specific aspects of present invention. For example, when DSM process engine 320 is omitted from system, the system could still perform automatic routing of interconnect, but without providing DRC checking capabilities.

A graphical user interface 302 provides users a graphical interface in which to perform operations on the integrated circuit design. For example, the user can view the integrated circuit using the graphical interface. The user may use the mouse and cursor to select a particular polygon or feature, such as a net. The user may expand or zoom into areas of the integrated circuit design.

A global router 304 is an automatic routing engine that coarsely routes interconnects of the integrated circuit, thus enabling large designs to be routed more rapidly and completely. The global router may also provide visual and quantitative analysis of the congestion in the design by highlighting problem areas that can be fixed by incremental adjustments to the floor plan. The global router is sometimes referred to as a coarse router because it provides generally the routes for the interconnect, and may work in conjunction with a detail router 308 (discussed below) to place the geometries of the interconnect.

A manual editor 306 is a shape-editing suite for creating or editing metal, keep-outs, routing areas, and the ability to partition a design into smaller areas. These areas can then be worked upon individually and can be recombined at a later stage to complete the design. Full on-line design rule checking (DRC) ensures that manual operations are completed error-free first time. Powerful tools automatically push-aside existing wiring to make way for new wires and semiautomatic routing tools quickly close down troublesome nets by allowing the user to guide the routing engine around complex areas of the design.

The detail router 308 is an automatic router that completes the wiring in a design by determining the specific routes for each interconnect. The detail router may complete a portion of the wiring for design, such as for sections or specified cells of the design, or may complete all the wiring of the design. The detail router may route starting from scratch or from partially completed routing. In an implementation, the global router determines the general route paths for the interconnect, and the detail router takes this routing information from the global router and puts in the physical detailed geometries of the tracks and vias.

An engineering change order (ECO) engine 310 provides a capability to handle late stage ECO changes. Every element of the design can be modeled incrementally, thus eliminating the need to ever restart the physical design, no matter what changes may need to be made from upstream or downstream processes in the design. ECO engine capabilities can include the ability to shove or push cells aside to make space for new or relocated instances, and the ability to drop groups of components and automatically find legal placement sites for them minimizing the disruption to the design. When pushing or pulling cells, the wires remain connected to the cells and the wires lengthen, shorten, and move as needed, if possible, to keep the connections. The detail router can then repair any violating interconnects and stitch-up any newly introduced interconnects, with minimum impact, ensuring circuit stability is never compromised.

A timing-driven routing engine 312 provides RC timing analysis of interconnects. Used in concert with the detail router, the timing engine can determine the path of least delay for critical nets. Furthermore, the timing engine, in concert with an extraction engine, can actively select a longer path with a lower associated delay (e.g., due to lower capacitance) in preference to a shorter but slower route.

An extraction engine 314 is provided. Utilizing a unified, high-speed RC extraction engine, the crosstalk functionality accurately calculates the coupling between victim and aggressor signals. This same technology is then used to identify potential problems, and automatically implements a DRC correct solution without changing the path of the signal unnecessarily. In addition, signal-to-signal (or within and between classes of signals) spacing rules can be applied, and fully controllable automatic shielding can be used to protect particularly sensitive signals. The user is provided with unprecedented control over the resistance and capacitance in the signal path. Again, using the advanced built-in RC extraction technology, the user can separately control path resistance and capacitance, which is particularly useful for analog and mixed signal design.

In an implementation, the global router and detail router are linked to the extraction engine. So, for example, when running, the global router or detail router, or both, can call the extraction engine to obtain RC extraction information. The global router, detail router, or both, may use the RC extraction information when creating the interconnect routes. For example, the detail router may obtain RC extraction info from the RC engine in order determine whether an interconnect route meets current density rules, and widen the interconnect width as needed. More details are discussed in U.S. patent application Ser. Nos. 10/709,843 and 10/709,844, both filed Jun. 1, 2004 and incorporated by reference.

In a specific embodiment, an RC extraction driven constraints manager has been enhanced to ensure matching on a per-layer basis as well as the whole net or subnet. There is an increasing requirement in today's designs to match length, time, resistance and capacitance across nets on a per-layer basis. This ensures total net constraints are met as before but also guarantees designated nets can match on a per-layer basis.

The tightly coupled, high-speed RC extraction engine is used both during routing (global router or detail router, or both) and for post-routing extraction to reach timing closure in record time. Integrated timing analysis and curative features enable the management of delay within the design; the matching of delays within and between multiple nets; the sharing of delay between many nets in a signal path; and reducing the delay in critical nets by minimizing resistance and capacitance. Intelligent lengthening increases the delay of the faster nets, preventing shoot-through.

The detail router can address current density issues in analog design, to help achieve an optimum routing result for the entire design, and save valuable design time. The current information which is used to drive this current density functionality may come from, for example, a front-end schematic engine or simulation engine. The router can automatically route a net at varying widths to guarantee sufficient track widths at every point in the topology of the net to carry all current requirements. DRC and process checking tools locate any insufficient width areas that may exist in any routing, including automatically generated routing, manual routing, and imported prerouting.

A data export interface 316 is provided so data of the EDA system 300 may be exported for other processes. For example, output from the EDA system may be passed through the export interface to other EDA systems or software tools provided by other manufacturers. The export interface would provide output in a form, format, or structure, acceptable by process or software tool to which it is being exported.

A data import interface 318 provides the means to import data, such as a circuit layout, netlist, or design constraints. The data to be import may be in various formats including data saved from other EDA systems or software tools. In addition, the source of the data may be a database, floppy drive, tape, hard disk drive, CD-ROM, CD-R, CD-RW, DVD, or a device over a communication network. Some examples of import formats include text, ASCII, GDSII, Verilog, SIF, and LEF/DEF.

A DSM process engine 320 is provided. The DSM process engine does design rule checking (DRC). Design rule checking locates and highlights where a design is breaking process design rules. For example, a design rule is the minimum spacing between metal lines (i.e., geometries on a specific layer). A design rule may be the minimum width of a metal line. A design rule may be a minimum polysilicon-to-diffusion spacing. There are many other design rules for a typical process. Some design rules are for checking geometries within a single layer, and some design rules are for checking geometries of two or more layers.

Figure 4:
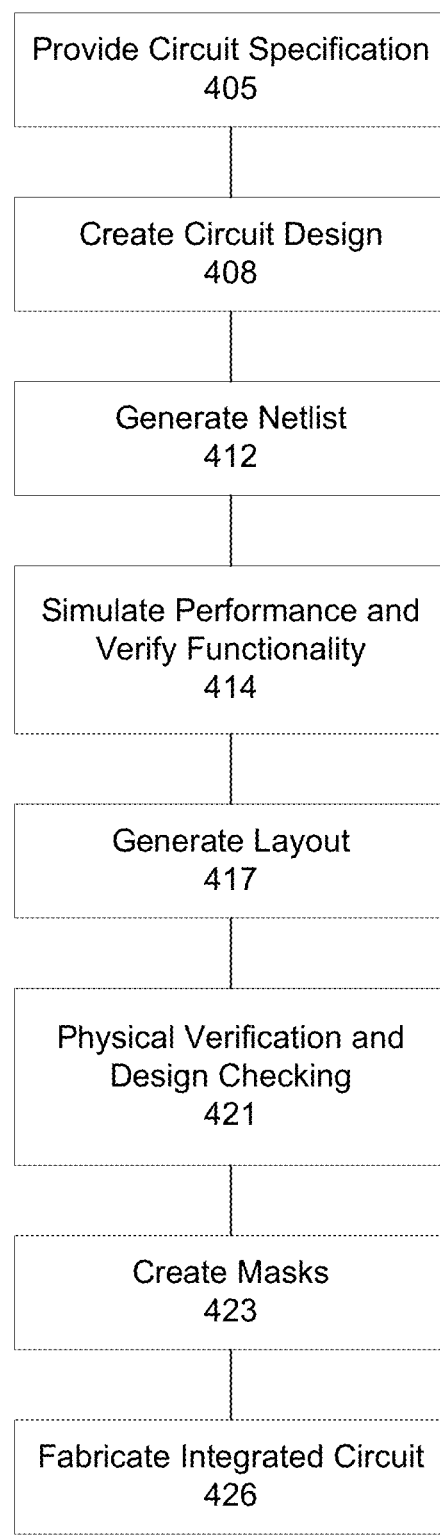
FIG. 4 shows a representative flow for designing an integrated circuit.

A user may design an integrated circuit using a system such as shown in FIG. 3. FIG. 4 shows a representative flow for designing an integrated circuit, and is further outlined in steps 1 to 8 below. Step 5 is further subdivided into three substeps.

Integrated Circuit Design Flow
1. Provide Circuit Specification (405)
2. Create Circuit Design (408)
3. Generate Netlist (412)
4. Simulate Performance and Verify Functionality of Circuit Design (414)
5. Generate Layout (417)
5a. Layout Devices
5b. Connect Devices
5c. Connect Blocks of Circuitry
6. Physical Verification and Design Checking (421)
7. Create Masks (423)
8. Fabricate Integrated Circuit (426)

Although the steps above are listed in a specific order, the steps may take place in any order, as desired and depending on the specific application. These are general steps that may be applied to designing an integrated circuit including custom, a gate array, standard cell, field programmable logic, microprocessor, digital signal processor, microcontroller, system-on-a-chip (SOC), memory, ASIC, mixed signal, analog, radio frequency (RF) or wireless, and others. There may be additional or other steps, which may replace one or more above steps. Certain steps may be repeated. For example, after generating a layout for a circuit design, the step of simulating performance and verifying functionality may be performed again. This time, the parasitics and RC considerations from the layout can be back-annotated into the netlist or circuit design, and the design simulated again. The results of this simulation will presumably be more accurate because more precise information is provided.

In step 1 of the flow, a circuit specification is provided. This is a specification or description of what the integrated circuit or circuit will do, and what the performance will be. For example, the integrated circuit may be a memory integrated circuit with particular address input pins and input-output (I/O) pins. Integrated circuit performance may be quantified terms in AC and DC performance. For example, AC performance refers to propagation delays, maximum clock frequency, clock-to-output delay, hold time, and other similar parameters. DC performance refers to maximum supply current, maximum and minimum supply voltage, output current drive, and other similar parameters.

In step 2, an engineer creates a circuit design that presumably will meet the circuit specification. This circuit design may include transistors, resistors, capacitors, and other electronic components. The engineer uses these electronic components as building blocks of the design, interconnecting them to achieve the desired functionality and performance. The engineer may make a custom design using electronic component building blocks or use a gate array, where the building blocks are sets of cells set by the gate array manufacturer. The design may be input using a graphical design tool such as schematic capture program, and any other design tool may be used. The circuit may be described using a high-level design language (HDL). These design tools will create a netlist (step 3) of the circuitry, which is a listing of the components of the devices and their interconnections.

During the design phase, the engineer simulates the performance and verifies the functionality of the circuitry (step 4). There are transistor and process models to model the components. Some simulation tools include Spice, which performs circuit simulation, and Verilog, which performs functional and timing verification. This is where the electrical information for current density routing is generated.

After deciding upon an initial circuit design, the engineer begins layout (step 5) of the circuitry. Layout refers to making the three-dimensional dispositions of the element and interconnections to make an integrated circuit. Making an integrated circuit is a layer by layer process. Some layers of an integrated circuit are diffusion, polysilicon, metal-1, metal-2, contact, via, and others. There may be multiple layers of the same material, but on different layers. For example, diffusion and polysilicon layers are used to make MOS transistors (step 5a). For example, metal-1 and metal-2 are two different layers, where metal-1 is below the metal-2 layers. These metal layers may be connected together using a via. Metal is typically used for interconnections (step 5b) and supplying power and ground to the devices.

Software tools may be used to help with the layout of the circuit, such as the automatic routing of interconnect (steps 5b and 5c). The interconnect may be between devices. Devices and circuitry may be grouped into blocks or cells having inputs and outputs. The interconnect may be between these blocks or cells (step 5b).

In step 6, after or while the layout is generated, the physical design is verified and checked. For example, some of these operations may include layout-versus-schematic (LVS) checking, electrical rule checking (ERC), design rule checking (DRC), layout simulation (especially for analog circuitry), power analysis, and timing analysis. Physical verification and design checking is often iterative. Based on the design check, a design engineer or user may make changes to the design or layout, or both and the design may be rechecked in order to make sure any areas of concern or design errors have been cleared.

The result of layout is data (e.g., provided in GDSII or other format) that is used to make the masks (step 7). The masks are used to fabricate the integrated circuit (step 8) using a photolithography process. Typically, there are many "copies" of the same integrated circuited fabricated on the same wafer. Each integrated circuit is a "die" on the wafer. Good dies are separated from the bad dies. The good dies are sawed and packaged. Packaging generally includes encapsulating the die in plastic or other material, and connecting pads of the integrated circuit to pins of the package, where the integrated circuit can be interfaced.

A flow for automated analog layout is described in this application. Some specific flow examples are presented, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figure 5:
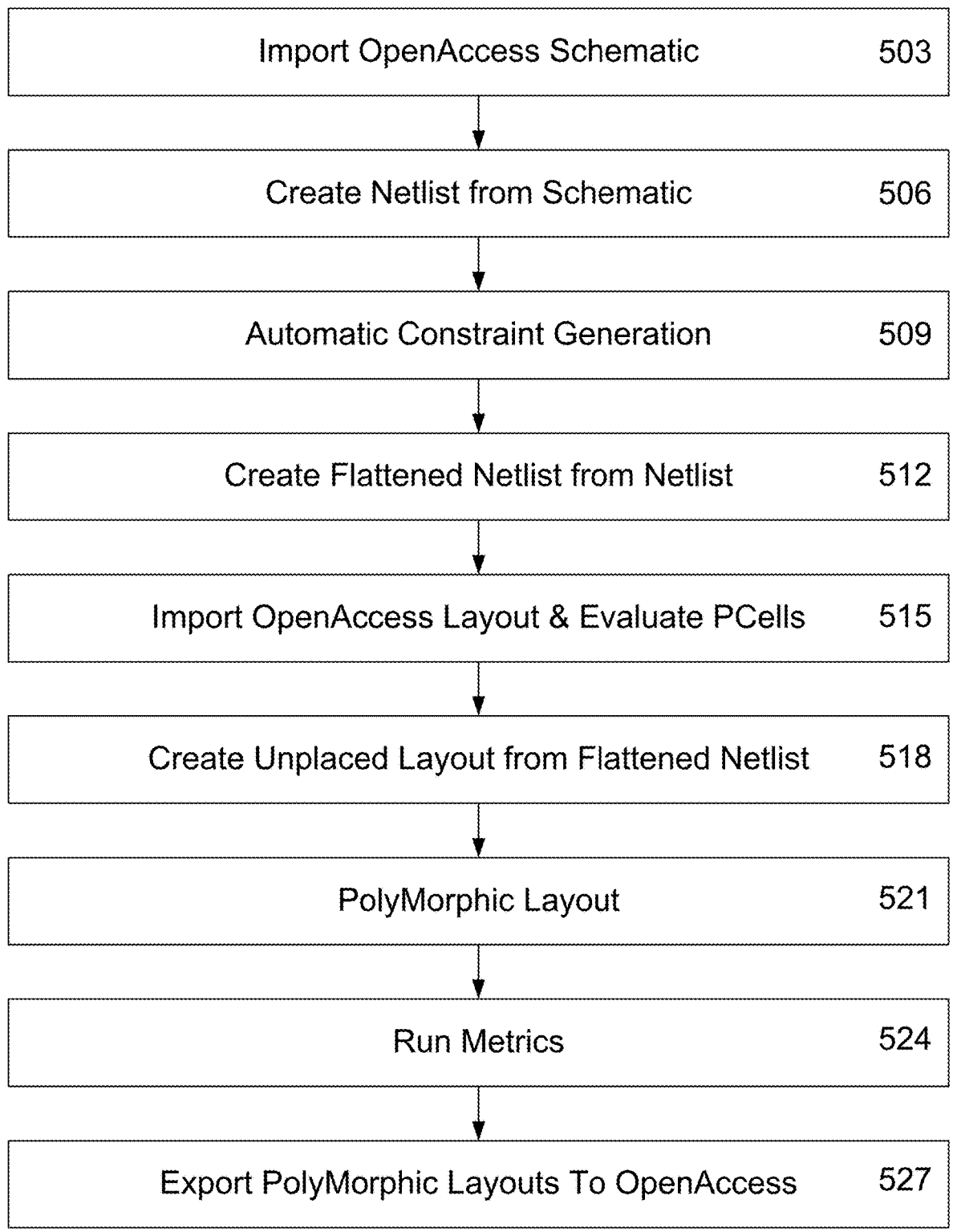
FIG. 5 shows a flow diagram for an automated analog layout system.

FIG. 5 shows a flow diagram for an automated analog layout system. This flow is for a nonhierarchical schematic. A flow for a hierarchical schematic has similarities.

In a step 503, the system imports a schematic, such as an OpenAccess schematic or other types of schematics. OpenAccess is a community effort to provide true interoperability, not just data exchange, among IC design tools through an open standard data API and reference database supporting that API for IC design. The OpenAccess Coalition is a neutral organization of industry leaders that are leading this effort operating under Si2 bylaws.

The OpenAccess API is a C++ program interface to IC design data. The API and reference implementation provide a high performance, high capacity electronic design database with architecture designed for easy integration and fast application development. Access to the reference database source code is provided to allow companies to offer contributions to future database enhancements and add proprietary extensions. It will also allow for this database to be used in production environments where software maintenance is critical. More information about OpenAccess is available at the Silicon Integration Initiative, Inc (Si2) Web site, https://www.si2.org/?page=69, which is incorporated by reference.

In a step 506, the system creates a netlist from the schematic. In a step 509, the system automatically generates constraints. In a step 512, the system flattens the netlist to obtain a flattened netlist.

In a step 515, the system imports the OpenAccess layout and evaluates parameterized cells (also referred to as PCells or P-cells). PCell stands for parameterized cell, a concept used in the automated design of analog integrated circuits. A PCell represents a part or a component of the circuit whose structure is dependent on one or more parameters. Hence, it is a cell which is automatically generated by electronic design automation software based on the values of these parameters. For example, one can create a transistor PCell and then use different instances of the same with different user defined lengths and widths.

Vendors of EDA software sometimes use different names for the concept of parameterized cells. Some examples includes T-Cell and Magic Cell. Two variations of parameterized cells are Cadence Skill PCells and Synopsys PyCells. Synopsys PyCells are described at the Synopsys Web site, https://www.synopsys.com/TOOLS/IMPLEMENTATION/CUSTOMIMPLEMENTATION/Pages/pycell-studio.aspx, which is incorporated by reference.

In a step 518, the system creates an unplaced layout from flattened netlist. In a step 521, a polymorphic layout is generated. A flow diagram and more details on the polymorphic layout are described below. In a step 524, the system runs metrics on the polymorphic layouts. In a step 527, the system exports the polymorphic layouts to OpenAccess.

Figure 6:
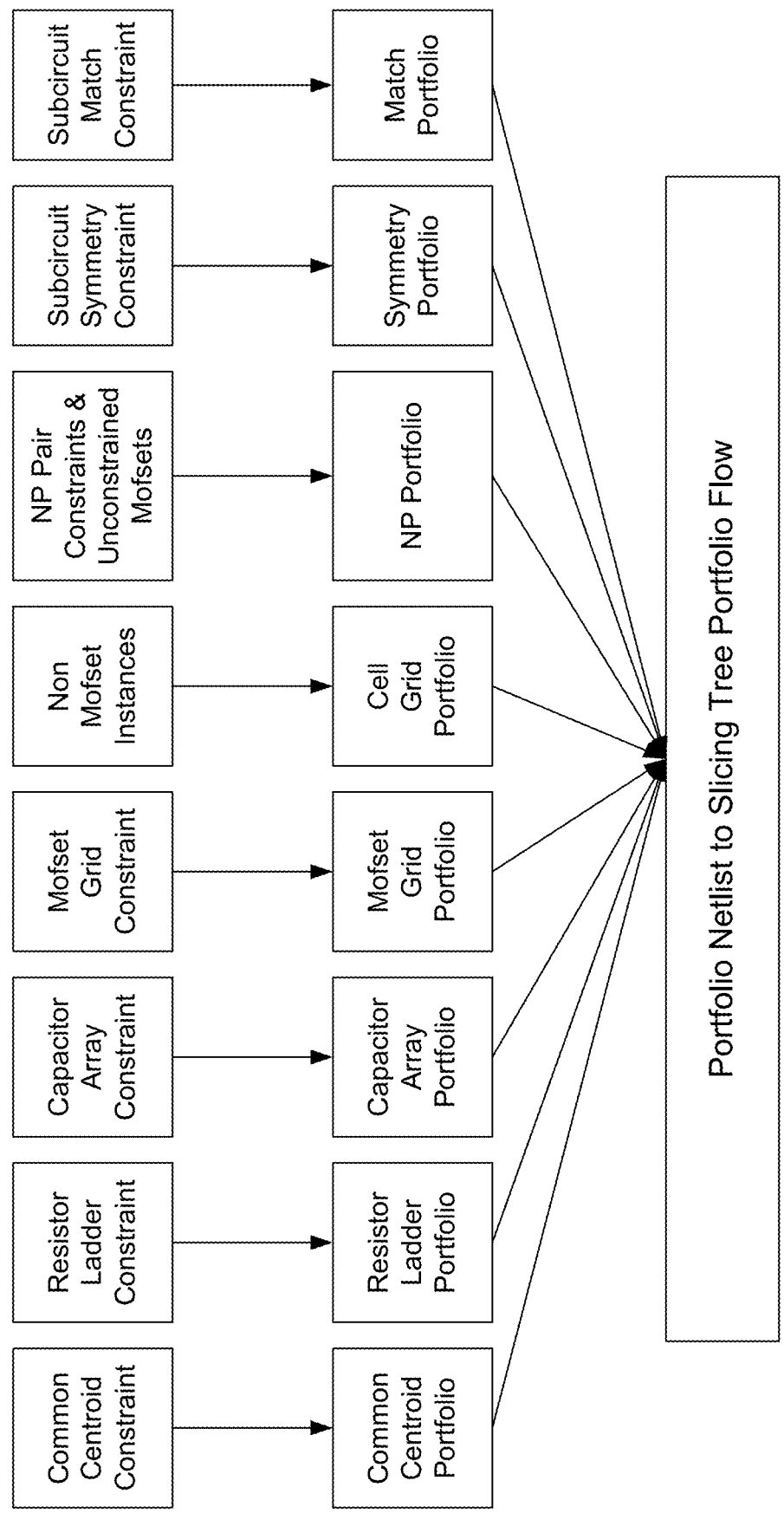
FIG. 6 shows an overview of the polymorphic layout process.

FIG. 6 shows an overview of the polymorphic layout process. Generally, constraints are input into a portfolio, and these portfolios are input to a portfolio netlist to slicing tree portfolio flow. A portfolio is a collection of blueprints. A blueprint is a fully placed and routed layout. Block placement is a deferred decision making enabled fixed-outline floorplanner.

In particular, common centroid constraints are input to a common centroid portfolio. Resistor ladder constraints are input to a resistor ladder portfolio. Capacitor array constraints are input to a capacitor array portfolio. MOSFET grid constraints are input to a MOSFET grid portfolio. Non-MOSFET instances are input to a cell grid portfolio. NP pair constraints and unconstrained MOSFETs are input to an NP portfolio. Subcircuit symmetry constraints are input to a symmetry portfolio. Subcircuit match constraints are input to a match portfolio. These portfolios, individually or in any combination, are input to the portfolio netlist to slicing tree portfolio flow.

Figure 7:
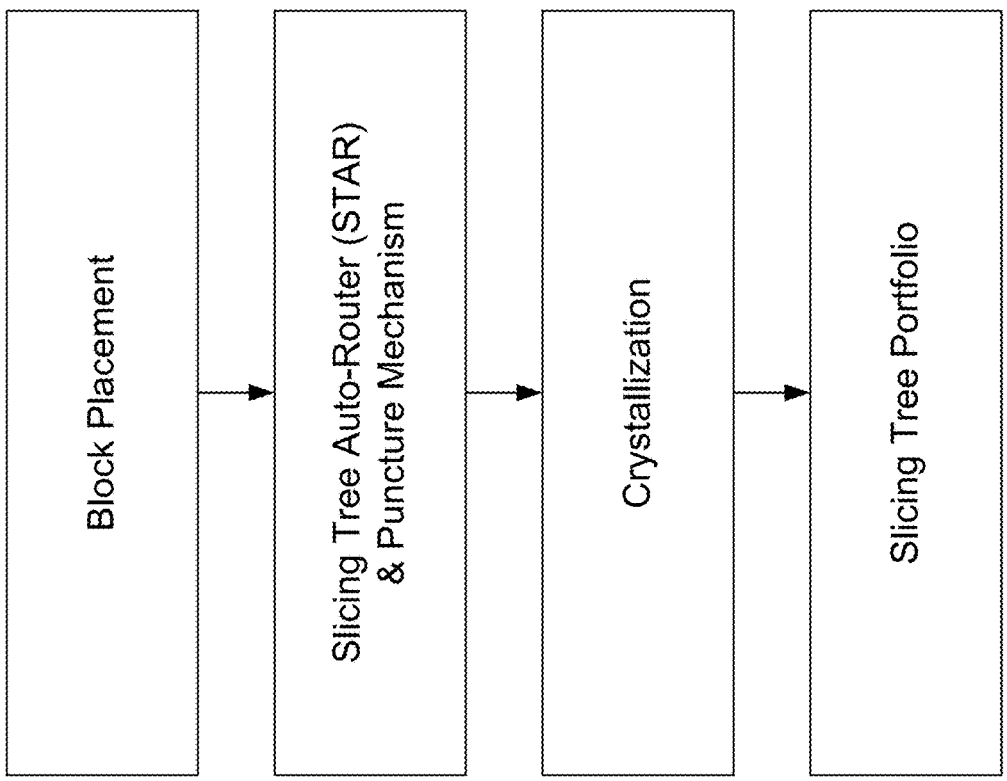
FIG. 7 shows a portfolio netlist slicing tree portfolio flow.

FIG. 7 shows a portfolio netlist slicing tree portfolio flow. This flow includes block placement, slicing tree autorouter (STAR) and puncture mechanism, crystallization, and slicing tree portfolio.

Figure 8:
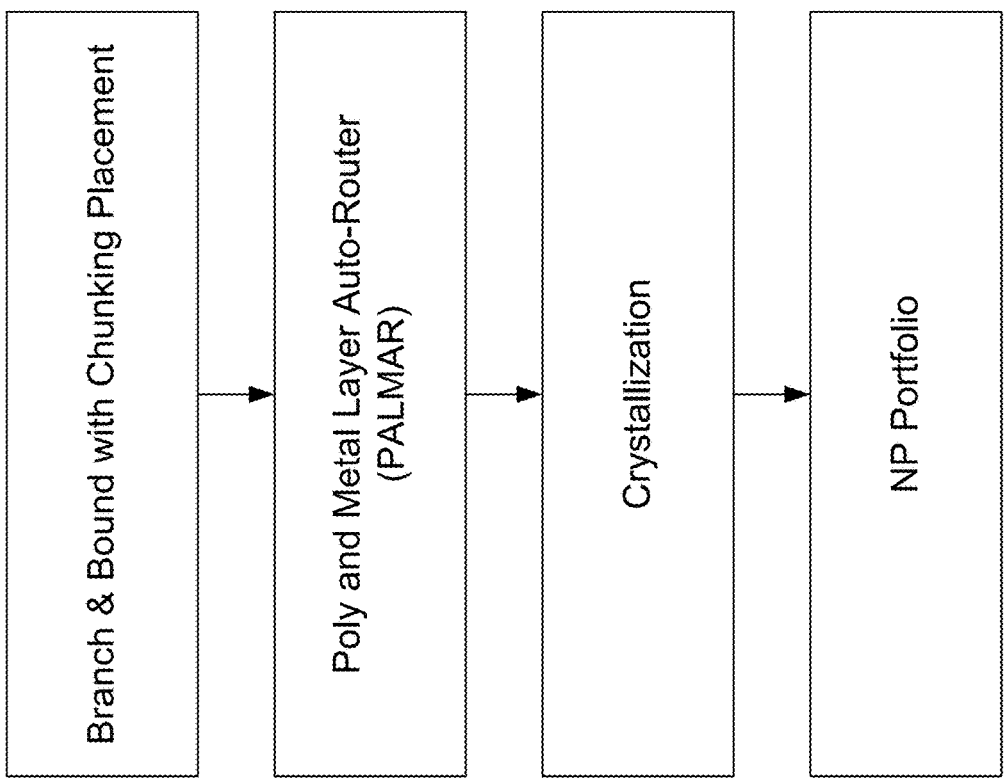
FIG. 8 shows an NP portfolio flow.

FIG. 8 shows an NP portfolio flow. This flow includes a branch and bound with chunking placement, polysilicon and metal layer autorouter (PAMLAR), crystallization, and NP portfolio.

FIG. 9 shows a subcircuit symmetry flow. This flow includes generate relevant portfolio for left, clone left to generate right portfolio, and portfolio netlist to slicing tree portfolio flow.

FIG. 10 shows a subcircuit match flow. This flow includes generate relevant portfolio for master match-group, clone master to generate slave match-group portfolios, and portfolio netlist to slicing tree portfolios.

A specific implementation of an automated analog layout tool is Pulsic Animate. Pulsic Animate is the first complete layout system built from the ground up for analog and transistor level custom digital design. Animate offers designers an easy-to-use flow that reads in a schematic, automatically extracts design constraints, and employs unique PolyMorphic technologies to produce manual-quality layouts in just minutes.

Analog layout automation has always lagged far behind digital layout automation. The solutions that have come to market have all fallen short in terms of quality of results, usability and efficiency. These analog tools, which primarily have been digital tools force-fitted to the analog problem, produced layouts inferior to those that analog designers could produce by hand. This was because placement and routing were performed as separate, serial operations. For an optimal analog layout, placement must be performed in the context of routing, and likewise routing is dependent on placement. An analog designer would consider both simultaneously during manual layout.

In addition, passing constraints from the circuit designer to the layout engineer was error-prone and so time-consuming that often a design could be laid out by hand faster than with the automated solution. Until recently, analog designers could still create a single, high-quality layout manually within the time constraints of their design cycles, so they had little incentive to adopt automated flows that produced poor layouts and saved little time, if any.

However, as analog designs have begun to target process nodes well below 90 nanometers, the complexities of analog layout have made automation a pressing need for many design teams. Electrical issues such as layout-dependent effects (LDE), electro-migration (EM), voltage (IR) drop, and noise coupling have more impact with smaller geometries, and automated solutions are required to ensure correct-by-construction layouts. Accurate simulation requires at least initial layout parasitic estimates—using PCells or PyCells without extracted layout parasitics is increasingly inaccurate—so layout delays slow the entire design flow considerably.

But analog design teams also need manual-quality results, automatic constraint handling and an easy, made-for-analog flow.

Figure 11:
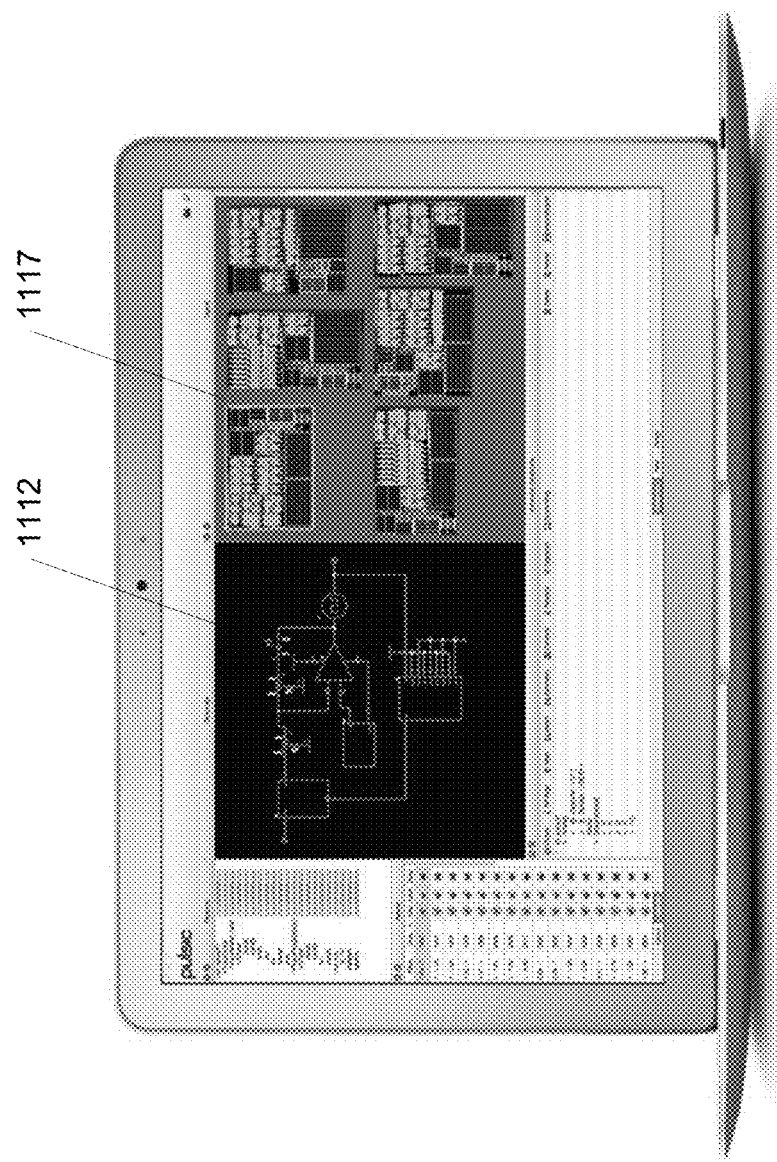
FIG. 11 shows a computer executing an automated analog layout software tool.

FIG. 11 shows a computer executing the Pulsic Animate software. The computer screen shows a screen of the Pulsic Animate software. The Animate software handles multiple levels of hierarchy. The Animate screen has a window 1112 that shows circuit schematic and a window 1117 showing proposed layouts for the circuit schematic in window 1112. Give the circuit schematic, the Animate system automatically generates a number of layouts in windows 1112.

In this example, window 1117 has six proposed layouts, where three layout cells are in a top row and three layout cells are in a bottom row. Each of the layouts cells is different from the other cells. The system can generate layout based on constraints parameters including, for example, area, design rule check (DRC), resistance for a particular net, width, height, number of vias, or routing length, or any combination of these.

The display or listing of the generated cells can be organized or sorted by area, design rule check (DRC), resistance for a particular net, width, height, number of vias, or routing length, or any combination of these. From the generated cells, the user can select which cell they would like to try or use in an integrated circuit layout.

Unlike any previous attempts at automating analog designs, Pulsic Animate offers an entirely new, made-for-analog approach to layout automation. Like an analog layout designer, Animate considers place and route concurrently, producing optimal-quality results.

Animate offers custom transistor-level analog and digital designers an easy-to-use, automated layout flow that takes existing schematics and rapidly extracts constraints based on netlist topology analysis. Animate then creates multiple, complete, DRC or LVS-correct layouts in minutes. Designers can modify or add to the automatic constraint recognition to customize their layout results.

Uniquely, Animate creates not just one, but many electrically correct layouts from the input schematic. Designers can explore multiple layout options in a fraction of the time needed to produce just a single layout by hand. Because Animate produces layout results so quickly, parasitics are available for simulation early in the design process, further speeding the entire design cycle.

Figure 12:
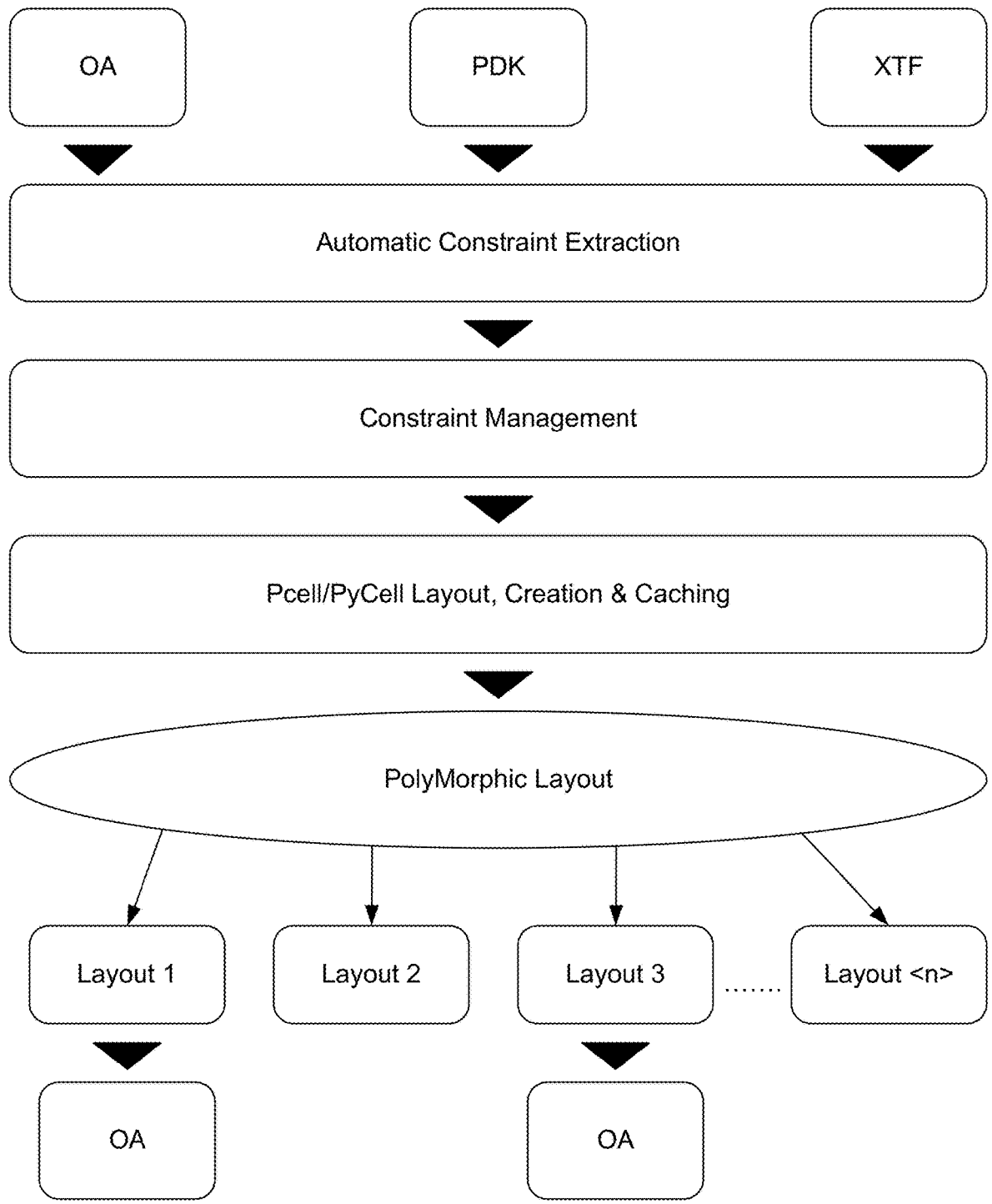
FIG. 12 shows a system diagram for the automated analog layout tool.

FIG. 12 shows a system diagram of Pulsic Animate. The system's flow reads in a schematic, automatically extracts design constraints, and creates multiple layouts. The system can automatically extract contraints from various types of files, including OpenAccess (OA), process design kit (PDK), or XTF. The system has constraint management. The system has parametric cell (e.g., Pcell or PyCell) layout, creation, and caching. These are inputs to a polymorphic layout technique that generate a number of proposed layout cells for the user. From the proposed cells, the user can select cells to use, which can be, for example, converted into an OpenAccess compliant format for use.

Drawing on more than a decade of working closely with leading-edge custom design groups, Pulsic has developed an entirely new approach to transistor-level layout. Called PolyMorphic Layout, this technology employs a novel database and algorithmic architecture to derive many potential forms for a layout, which crystallize into one or more final, DRC or LVS-correct forms.

Figure 13:
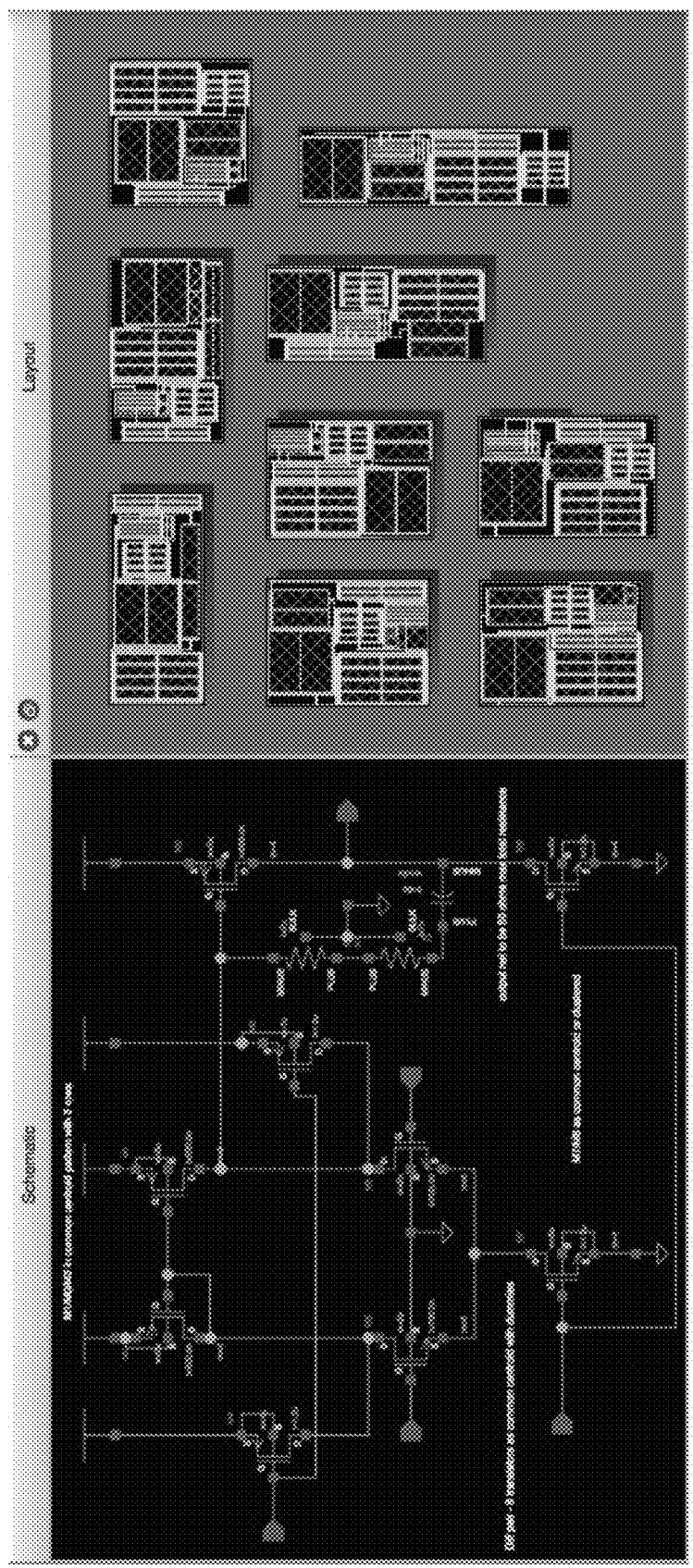
FIG. 13 shows a screen generated by the automated analog layout tool.

FIG. 13 shows a screen generated by the Pulsic Animate software. As discussed for the screen in FIG. 11, the screen has two windows, a first window (left side) for the circuit schematic of the cell, and a second window (right side) for a number of proposed layouts of the cells generated by the software.

Animate reads OpenAccess schematics, either hierarchical or flat, and automatically extracts constraints from the circuit topology (e.g., differential pairs, current mirrors, and current sources). Employing the PolyMorphic Layout technology, layouts are created so the interdependent effects of placement and routing can be optimized simultaneously. The process starts with the lowest-level leaf cells and moves up the hierarchy as cells are completed.

For each cell, Animate generates multiple complete, electrically correct layouts (see FIG. 13). Animate makes an initial selection of the best ones and uses those at higher levels in the hierarchy. Designers choose which layouts should be used and can lock layouts they want to keep. Animate will automatically incorporate these design choices into higher levels. Animate generates these multiple layouts in just minutes, so designers can explore various layouts and constraints with interactive speed.

Animate requires no arduous setup. A simple graphical user interface guides the user through the flow and enables designers to visualize layout options quickly. Constraints are derived automatically, but can be edited by the user quickly and easily. For example, Animate automatically generates common centroid structures from derived constraints with the routing needed to interconnect the devices in a matched fashion, with the option of adding dummy devices, guard rings, and other structures without any user scripting or programming.

Designers can use Animate at an early design stage, with minimal or no constraints, to explore possible layout architectures and extract early parasitics for simulation of layout-dependent effects (LDE). This approach can also provide far more accurate analog block/design size estimation during floor planning than previously has ever been possible.

With Animate, transistor-level designers gain not only the productivity of automation, but also the ability to explore many design options faster than ever before. Critically, the final result is comparable to that of an expert manual layout, but is produced in a fraction of the time.

Previous at automating transistor level layout have failed to produce results that are acceptable. Prior attempts split the placement and routing steps into two distinct phases. The placement step considers the position of each transistor, and attempts to minimize, along with other metrics, the interconnect length between the transistors. Only approximations of the routing problem are considered. The routing is not considered in detail. Once the position of each transistor has been determined, the routing detail is added. The routing detail may show that the position of the transistors allow insufficient space for the routing. What is more the routing and placement algorithms deploy the same approach for the entire circuit; generalizing the problem.

Animate has a novel architecture that allows subregions of a circuit to be generated using different layout algorithms, thus allowing bespoke implementations that optimize the particular requirement of a subregion. For example an op amp circuit may contain both resistors and a current mirror. In Animate, the layout for the current mirror region will be generated using a common centroid algorithm that minimizes the matching differences in the placement and routing, whereas the layout for the resistors region will be generated with a resistor ladder algorithm that can control the current direction through the resistors and place and route them in an optimal pattern that replicates hand-crafted layout quality. A single net might be common to the resistors and the current mirror but routed by three different algorithms.

Each subregion is generated such that it is placed and routed. The placement and routing detail is considered simultaneously such that the routing detail precisely fits.

Each subregion may have multiple ways of laying out the instances they are responsible for, and Animate considers these possibilities in combination with the other subregions, such that white space is minimized. By considering these different combinations Animate produces a range of different layouts for a single circuit.

In an implementation, this entire process or technique may be referred to as polymorphic layout.

Animate Flow

Figure 14:
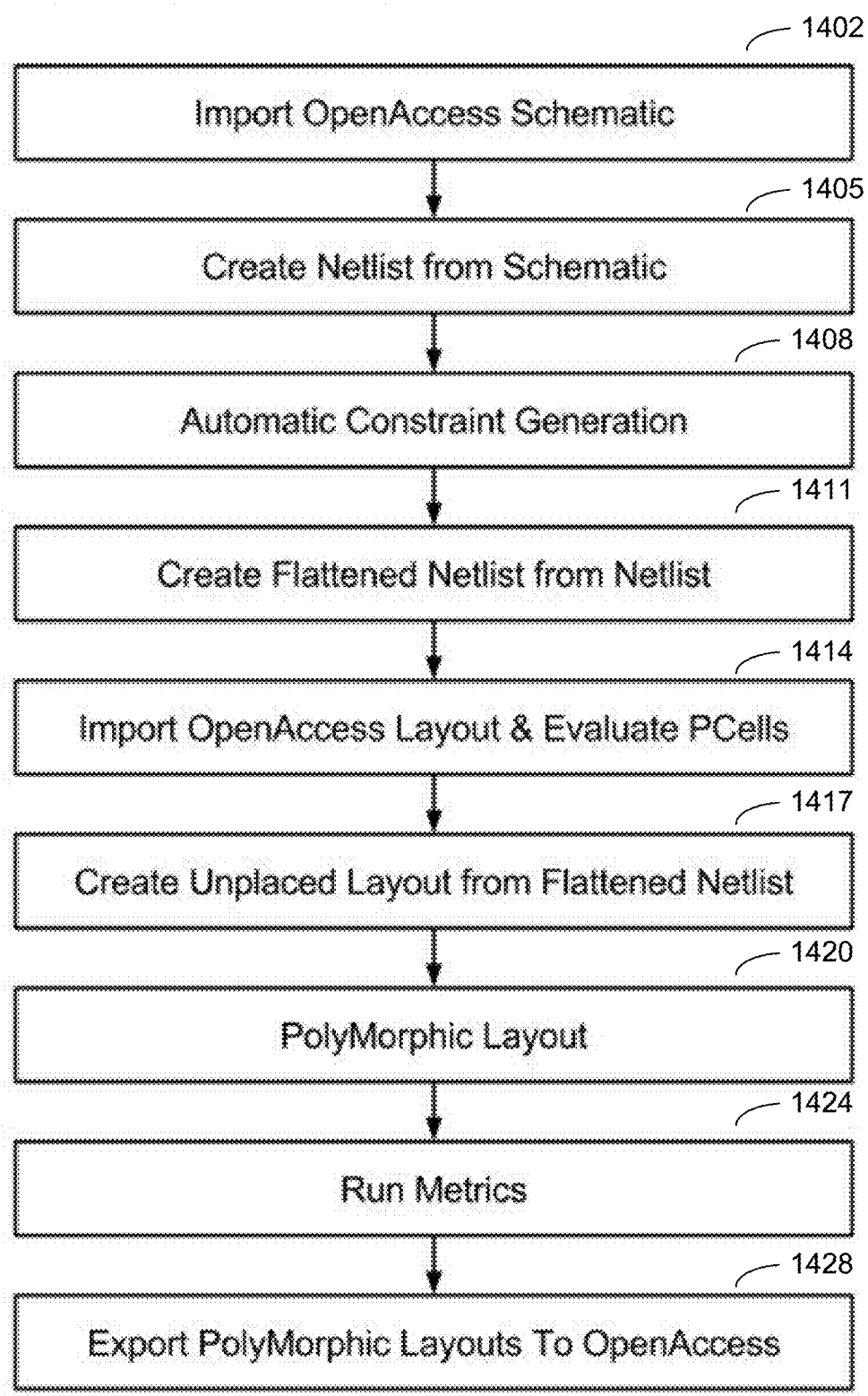
FIG. 14 shows a polymorphic layout flow with no hierarchy.

FIG. 14 shows an Animate flow with no hierarchy. In a step 1402, Animate reads schematic information from OpenAccess. In a step 1405, from the schematic, Animate generates a netlist, scalarizing as required. Scalarizing refers to a process of handling handles vectored instances. For example, a schematic may contain a single vectored instance "I1" with a value of 4. When the schematic is converted to a netlist, I1 would be converted into four netlist instances I1[1], I1[2], I1[3], I1[4].

In a step 1408, from the netlist, Animate generates the constraints. In a step 1411, the technique creates a flattened netlist from the netlist. In a step 1414, then Animate evaluates the layout for parameterized cells (e.g., both Cadence PCELLs and Synopsys pyCells), and loads any layout of static lower-level cells from OpenAccess. In a step 1417, combining the netlist and the cells, Animate creates an unplaced and unrouted layout. This unplaced and unrouted layout is the input to a polymorphic layout, which is described below. In a step 1420, polymorphic layout generates one or more placed and routed layouts, each of which can be assessed by third party metrics (step 1424) and then exported to an OpenAccess layout (step 1428).

Hierarchy

Animate supports hierarchical schematics by repeatedly applying the flow described above to each level of the hierarchy, starting at the lowest most level and working upwards. The layouts generated for a child level are passed as inputs to the parent level, and used as the possible master designs for the parent instances. The user can control which layouts are used as design masters with a "use" checkbox on Animate's graphical user interface. By default, "use" is ticked for every design within 10 percent area of the smallest.

Continuous Constraint Integration

The flow in FIG. 14 is entirely automatic from the point of the user specifying the schematic that should be loaded. The user can modify the constraints that the tool has automatically determined. When a constraint is modified, Animate automatically reruns the relevant subflow. As the Animate graphic user interface (GUI) is on a separate thread to the flow, the user can make multiple, continuous edits to the constraints without ever waiting for the flow to finish its current processing. In the background, the flow will run, interrupt, and rerun without interaction from the user. The user does not need to (nor indeed can) "start," "interrupt," or "restart" any tool within Animate. This simplifies the number of widgets dramatically on the GUI compared with other electronic design automation (EDA) tools, and reduces the learning and training time.

Constraint Generation

As stated above, Animate automatically generates constraints. This is achieved by looking for known small netlist patterns within the actual netlist using a subgraph isomorphism algorithm. Each small netlist pattern has an associated constraint. When a match is found the associated constraint is generated. The patterns are stored in a directory structure, in an ASCII format, and new patterns can be added by the user. The patterns available in Animate by default are described in the following table.

TABLE

| Pattern To Match | Constraint Generated |
|---|---|
| Current Mirror x1 | MOSFET Grid |
| Current Mirror x2 | MOSFET Grid |
| Current Mirror x3 | MOSFET Grid |
| Current Mirror x4 | MOSFET Grid |
| Current Mirror x5 | MOSFET Grid |
| Current Mirror x6 | MOSFET Grid |
| Current Mirror x7 | MOSFET Grid |
| Current Mirror x8 | MOSFET Grid |
| Current Mirror with Diff Pair | MOSFET Grid & Symmetry |
| Large M Factor | MOSFET Grid |
| M Factor | Cluster |
| Mosfet Capacitor x1 | Capacitor Array |
| Mosfet Capacitor x2 | Capacitor Array |
| Mosfet Capacitor x3 | Capacitor Array |
| Mosfet Capacitor x4 | Capacitor Array |
| Mosfet Capacitor x5 | Capacitor Array |
| Mosfet Capacitor x6 | Capacitor Array |
| Mosfet Capacitor x7 | Capacitor Array |
| Mosfet Capacitor x8 | Capacitor Array |
| OpAmp | Common Centroid x3 |
| CMOSPairAcrossHierarchy | NP Pair |
| CMOSPairSerialGrid4 | Cluster of MOSFET Grid x2 |
| CMOSPairWithCommonParent | NP Pair |
| CMOSPairWithCommonParentAndCommonSourceOrDrainNet | NP Pair |
| CMOSTransmissionGate | NP Pair |
| CMOSTristateInverter | NP Pair x2 |
| CMOSTristateInverterTiedHigh | NP Pair x2 |
| CMOSTristateInverterTiedLow | NP Pair x2 |
| ThreeInputAnd | NP Pair x4 |
| TwoInputAnd | Cluster of NP Pair x3 |

Polymorphic Layout Description

Figure 15:
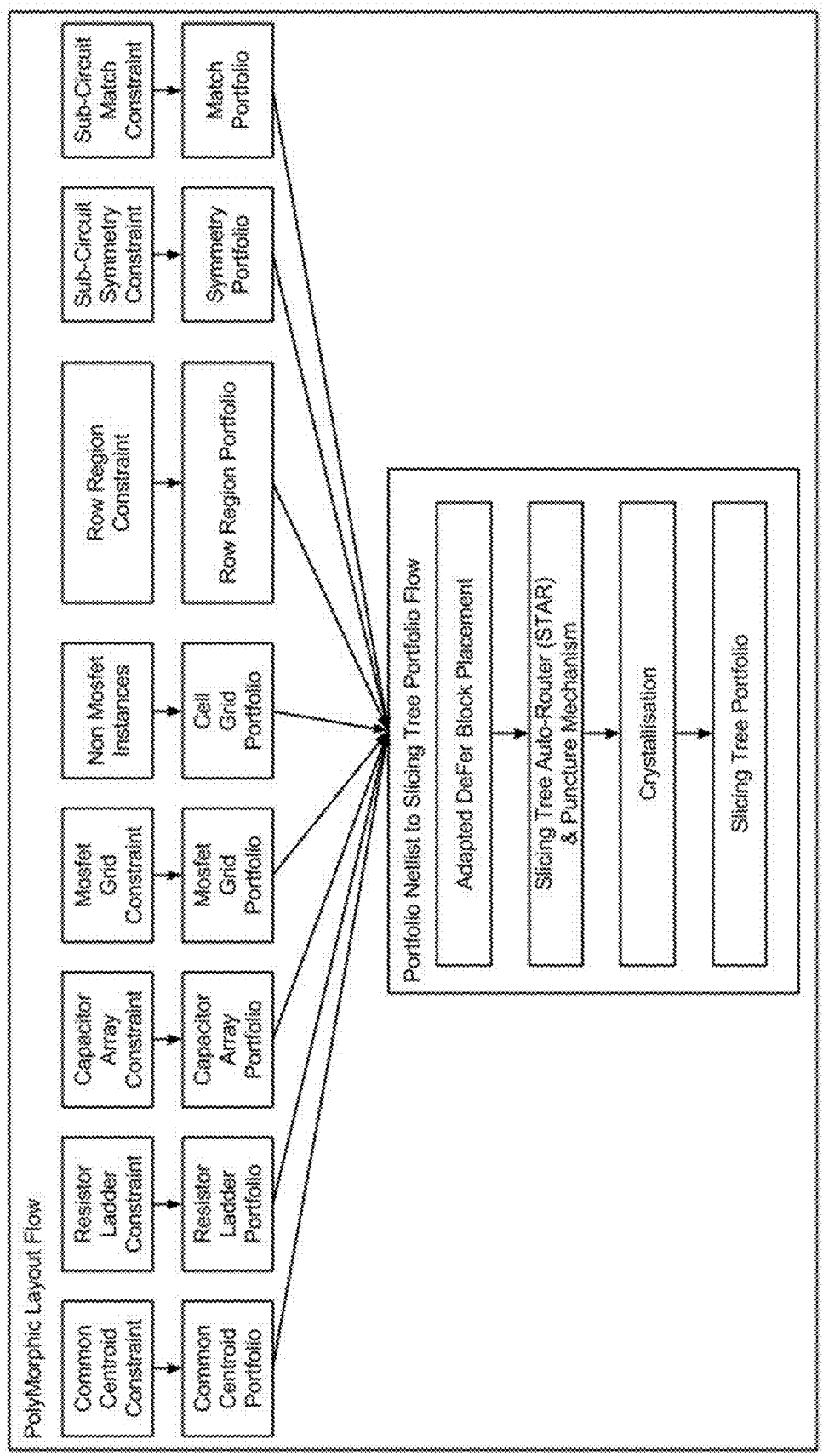
FIG. 15 shows a polymorphic layout flow.

FIG. 15 shows a polymorphic layout flow.

1. Animate uses instance constraints.

2. An instance belongs to no more than one instance constraint.

3. An instance constraint contains zero or more instances.

4. An instance constraint contains zero or more instance constraints.

5. Instance constraints form a directed tree with a single root (no cycles).

6. An instance constraint specifies particular layout behavior.

7. Instance constraints are automatically generated (described in a separate section).

8. Instance constraints can be modified interactively by the user.

9. Each instance constraint type has bespoke placement and routing algorithms.

10. Animate contains a common centroid instance constraint type (described below).

11. Animate contains a resistor ladder instance constraint type. (described below).

12. Animate contains a capacitor array instance constraint type. (described below).

13. Animate contains a MOSFET grid instance constraint type. (described below).

14. Animate contains a row region instance constraint type. (described below).

15. Animate contains a Subcircuit symmetry constraint type. (described below).

16. Animate contains a Subcircuit match constraint type. (described below).

17. Animate contains an align constraint type. (described below).

18. Animate contains a generic cell grid constraint type. (described below).

19. The architecture allows new constraint types to be added.

20. The placement and routing detail for each instance constraint is considered simultaneously such that the gaps between the instances is exactly right for the routing. I.e. the gap is sufficient to allow the routing to fit, but not excessive which would waste area.

21. Each instance constraint produces one or more sublayouts for the subset of instances that the instance constraint contains.

22. The sublayout is referred to as a "blueprint."

23. A collection of blueprints for the same subset of instances is referred to as a "portfolio."

24. The blueprints within a single portfolio have different aspect ratios.

25. Unless specified by some other instance constraint, portfolios are placed together to form a larger portfolio by adapting a technique such as Defer, described in Jackey Z. Yan and Chris Chu, DeFer: Deferred Decision Making Enabled Fixed-Outline Floorplanning Algorithm, IEEE Transactions on Computer-Aided Design of Integrated Circuits and Systems, Volume 29, Number 3, 367-381 (March 2010). Animate adapts the soft block mechanism of DeFer, and generates a shape curve from the width or height, or both, of each blueprint in the portfolio.

26. The placements described by the slicing trees produced by Defer are routed respecting the topological order, but ignoring the coordinates of the lower level blueprints. This routing algorithm is referred to as "STAR" (described in a separate section).

27. STAR connects its routing into the lower level blueprints by using mechanism referred to as "rupture" and "puncture."

28. Punctures are routing that connect from outside of a blueprint to the inside of a blueprint.

29. Ruptures are routing that connect from the inside of a blueprint to the outside of a blueprint.

30. A blueprint controls the punctures and ruptures. Thus ensuring all routing near the instances of a blueprint meet the layout behavior required of the blueprint.

31. The STAR routed slicing tree forms a slicing tree Blueprint. A Defer curve of these forms a slicing tree Portfolio.

32. The slicing tree Portfolio, and other Portfolio types, use a process known as "crystallization" to convert a topological description of the layout into coordinate based layout database.

Crystallization

Figure 16:
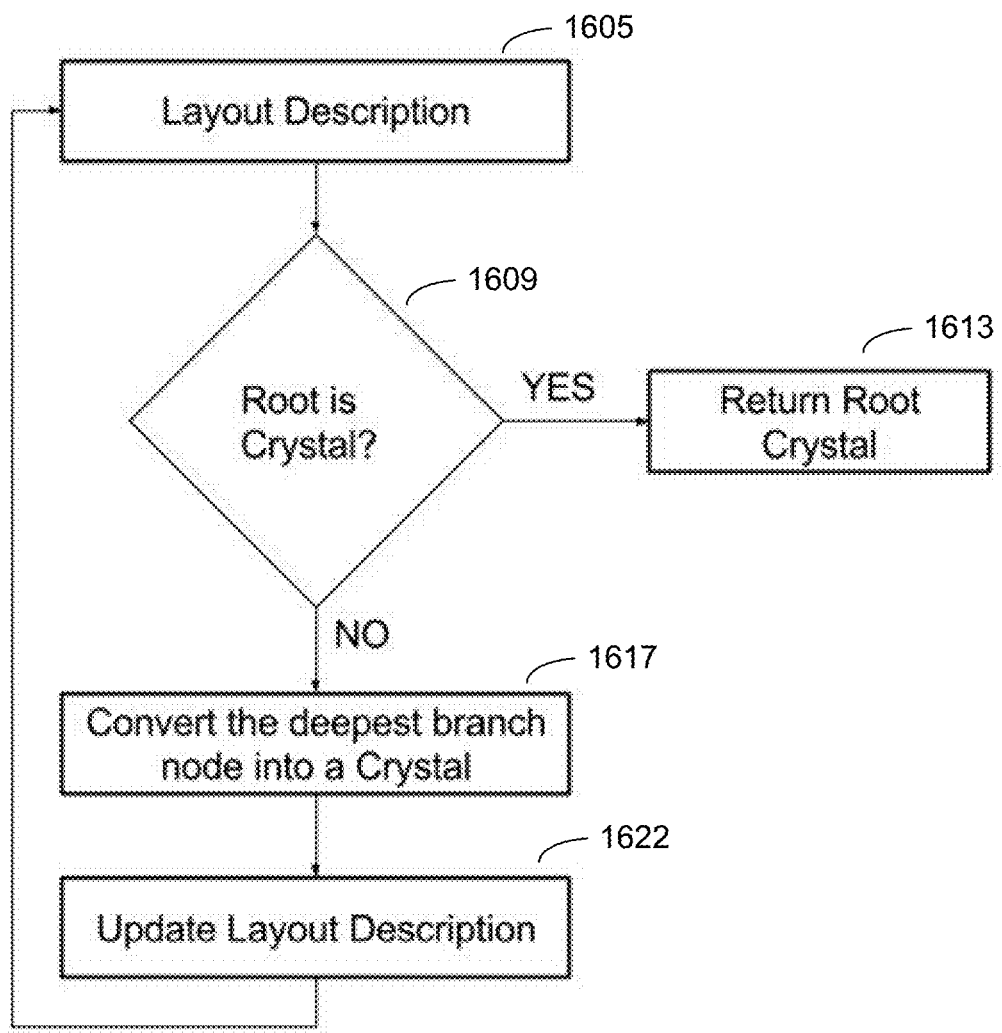
FIG. 16 shows a crystallization flow.
Figure 17:
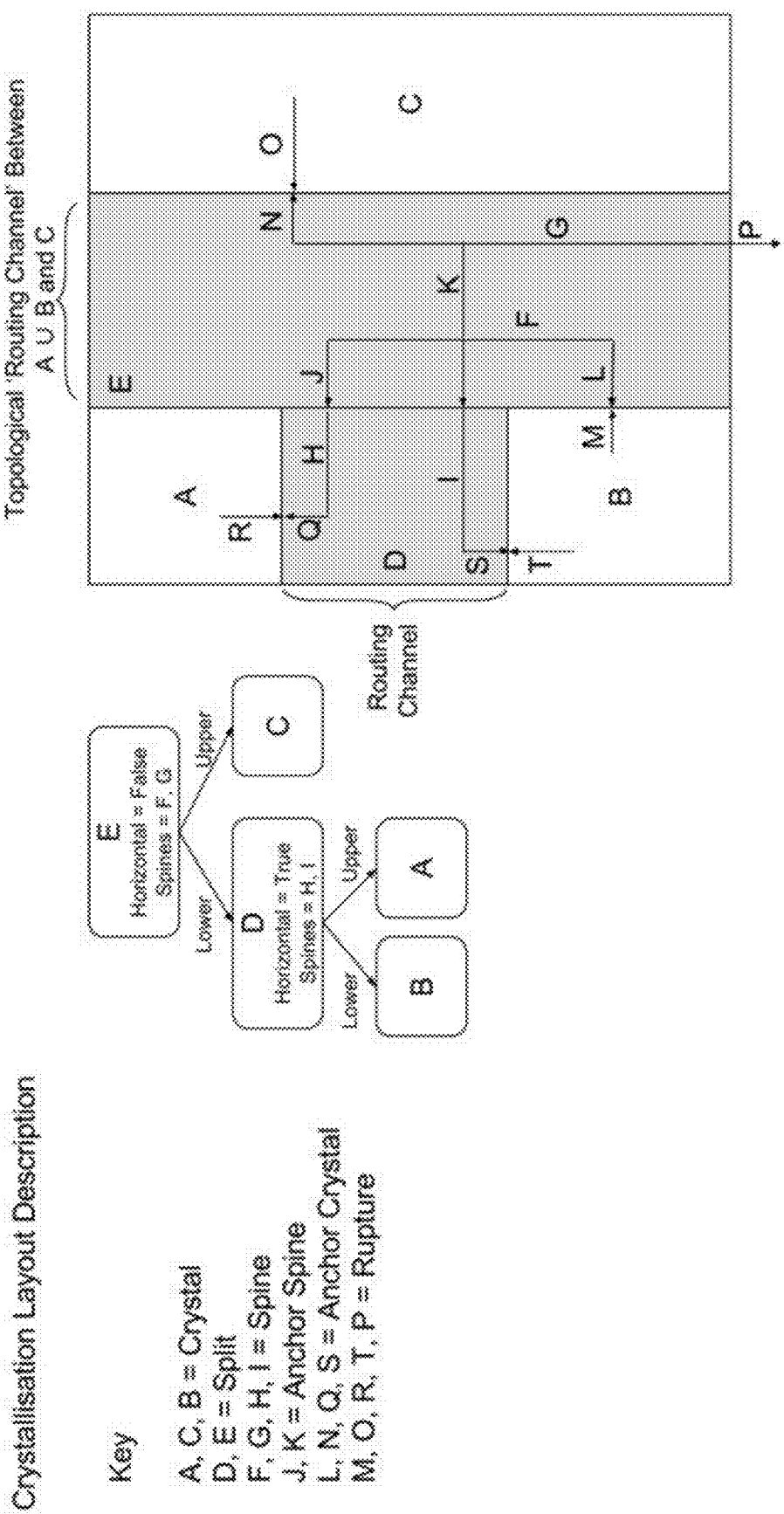
FIG. 17 shows a crystallization layout description.
Figure 18A:
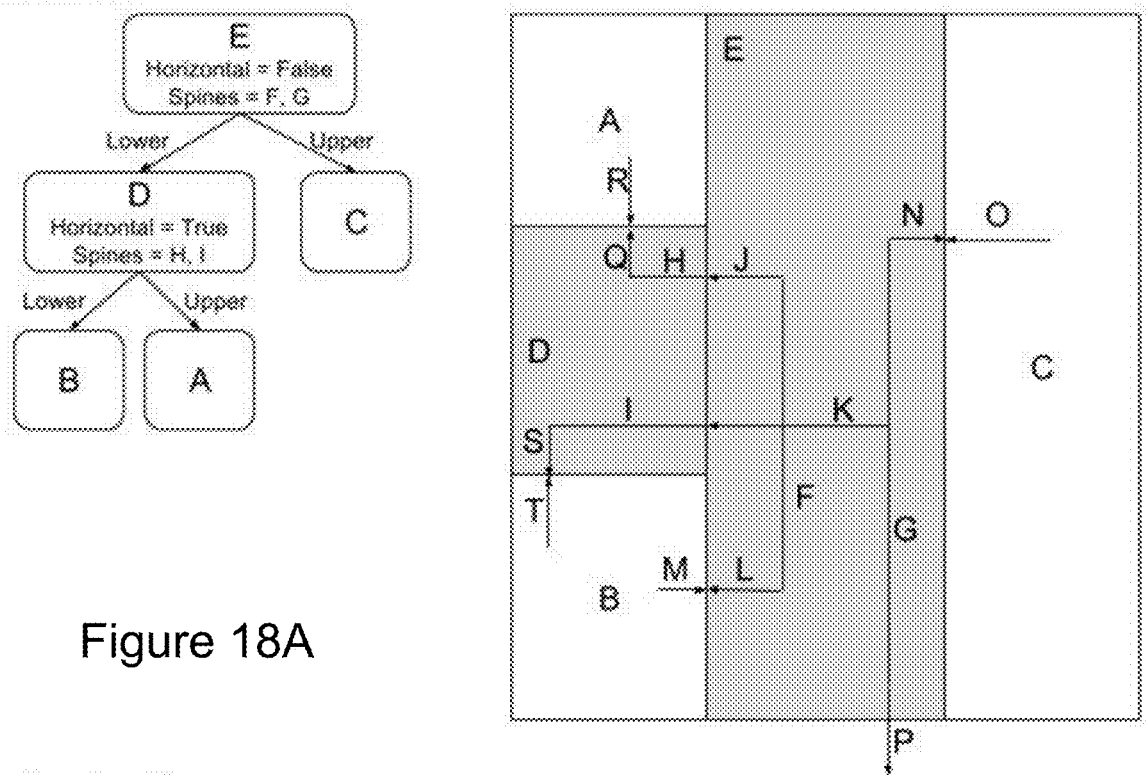
FIGS. 18A-18C show an example of crystallization.
Figure 18B:
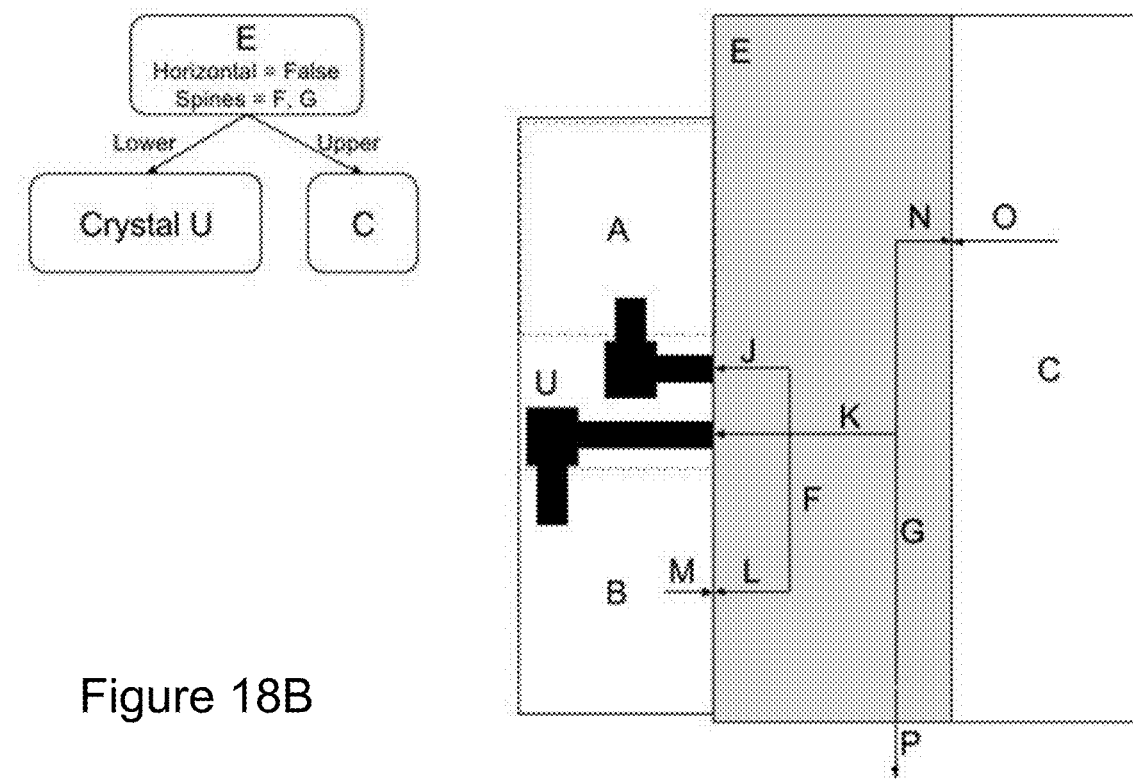
Figure 18C:
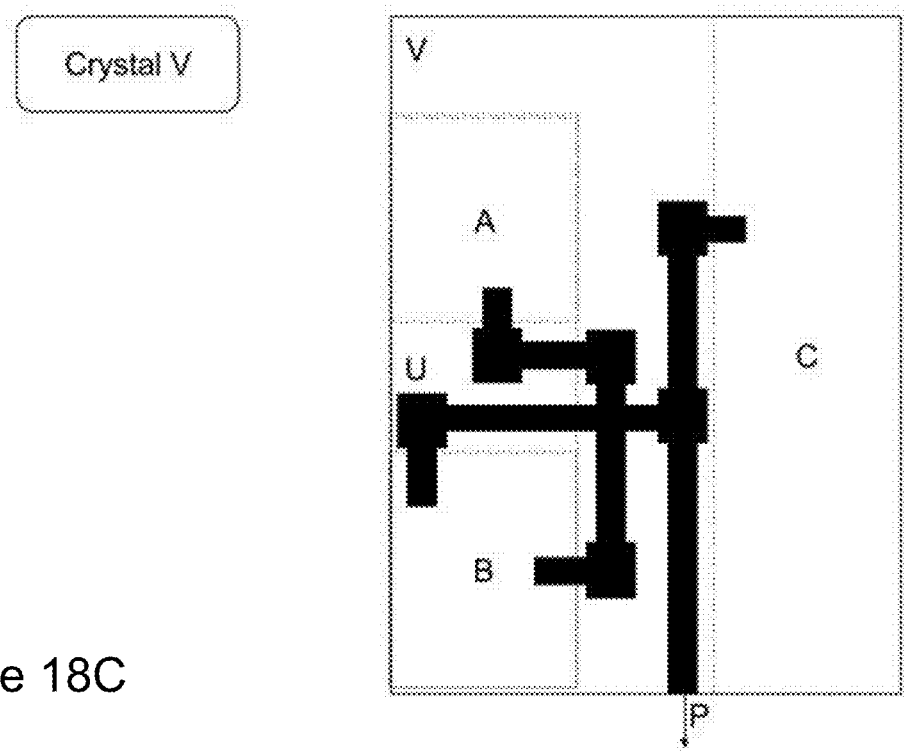

FIG. 16 shows a crystallization flow. FIG. 17 shows a crystallization layout description. FIGS. 18A-18C show an example of crystallization.

1. Crystallization is a process for converting a topological description of a layout into a typical layout database where the entities of the database have coordinates.

2. Referring to FIG. 16, in a step 1605, the input topological description of a layout is refer In a step 1609, the technique determines whether the root is a crystal. If true or yes, return to root crystal (step 1613). If false or no, convert the deepest branch node into a crystal (step 1617). In a step 1622, the layout description is updated.red to as a "Layout Description."

3. The output coordinate based database is referred to as a "Crystal."

4. The Layout Description is based on a slicing tree.

5. The Layout Description slicing tree is augmented with routing information.

6. The branch node of the slicing tree is referred to as a "Split."

7. The leaf node of the slicing tree is referred to as a "Crystal." This is the same as the output—a coordinate based database.

8. The Split has an associated routing channel.

9. The routing channel has zero or more Spines that represent tracks that run parallel to the split direction.

10. The order of the Spines in the channel represents the relative order of the tracks in the output.

11. The leaf Crystals have Ruptures. Ruptures specify where routing can connect into a Crystal.

12. A Spine can have zero or more "Anchors." Anchors specify how the Spine connects to other objects.

13. The Spines connect to leaf Crystals using "Crystal Anchors" that specify a Rupture of the Crystal to connect with.

14. The Spines connect to Spines in other Splits using "Spine Anchors" that specify the Split and Spine.

15. The crystallization process starts at the bottom level of the augmented slicing tree.

16. A Split and its left and right child Crystals are converted into a new Crystal.

17. The geometry of the left child Crystal is pushed onto a stack. Each Spine in the Split generates its geometry. In turn, each Spine geometry is pushed onto the stack such that it is as close as the DRC rules allow to the existing stack contents. Once all Spine geometry has been pushed onto the stack, the right child Crystal geometry is pushed such that it is also as close as the DRC rules allow to the existing stack contents. The entire stack gives the relative offset for the left and right Crystal, and the relative offset for the geometry of each spine. Thus the coordinates for each geometry element in the Split is now known. This information is recorded and forms a new Crystal.

18. Ruptures on the new Crystal are created where spines needs to extend out of the new Crystal to connect to Spine Anchors of high level Spines.

19. This step reduces the depth of the slicing tree by one.

20. Spine Anchors are converted into Crystal Anchors for anchors that were connected to spines that are contained within the Split that has just been converted into a Crystal.

21. This process is repeated until the root Split is a Crystal. At this point all topological information has been resolved into a coordinate based database, and the process terminates.

Slicing Tree Auto Router (STAR) and Puncture

1. The input to a slicing tree auto router (STAR) is a slicing tree where each leaf node is a portfolio blueprint, and a netlist describing the inter-blueprint connectivity.

2. STAR will create topological routing paths in the channels that are formed between adjacent Blueprints in the Slicing Tree, such that the Blueprints are routed together as required by the netlist.

3. The algorithm processes each net in turn.

4. First each Blueprint that is connected to the given net is asked to Puncture on its west, south, east and north sides. A Puncture represents the routing from outside of a Blueprint to the inside of the Blueprint, with the exact routing path being determined by the given Blueprint such that the Blueprint can maintain its required layout properties. Some Puncture requests may fail, but the Blueprint guarantees that at least one will succeed.

5. STAR then uses an obstacle avoiding rectilinear steiner tree algorithm, such as "Obstacle-avoiding Rectilinear Steiner Tree Construction by Liang Li and Evangeline F. Y. Young" from the puncture exit points to find paths that connect at least one puncture from every relevant Blueprint.

6. The punctures that have been used, and the generated paths, are recorded.

7. The algorithm repeats steps 4 to 6 until all nets have been topologically routed.

8. By using biased routing, the majority of nets will be mutually compatible. The remaining compatibility issues are resolved by ordering the paths in the channels, and finally by offsetting opposing tributary channels.

9. The output of the algorithm is a topological Steiner tree for each net.

Common Centroid Instance Constraint Type or Portfolio

Figure 19:
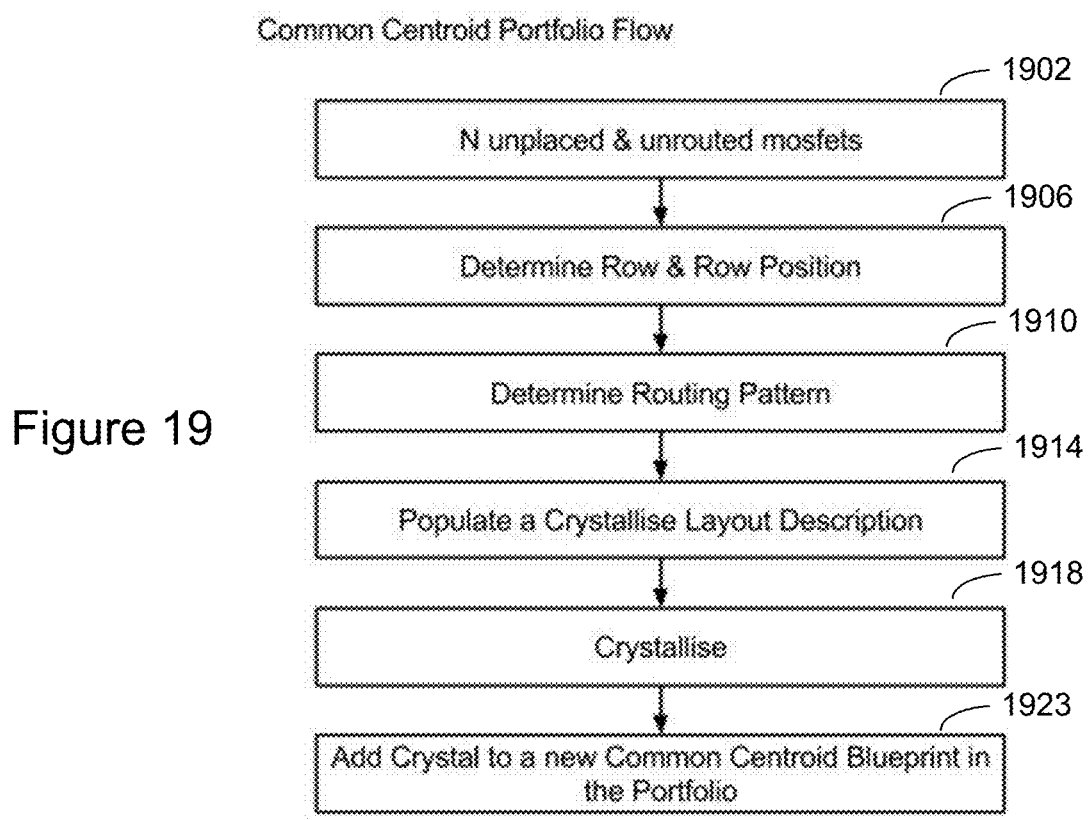
FIG. 19 shows a common centroid portfolio flow.
Figure 20:
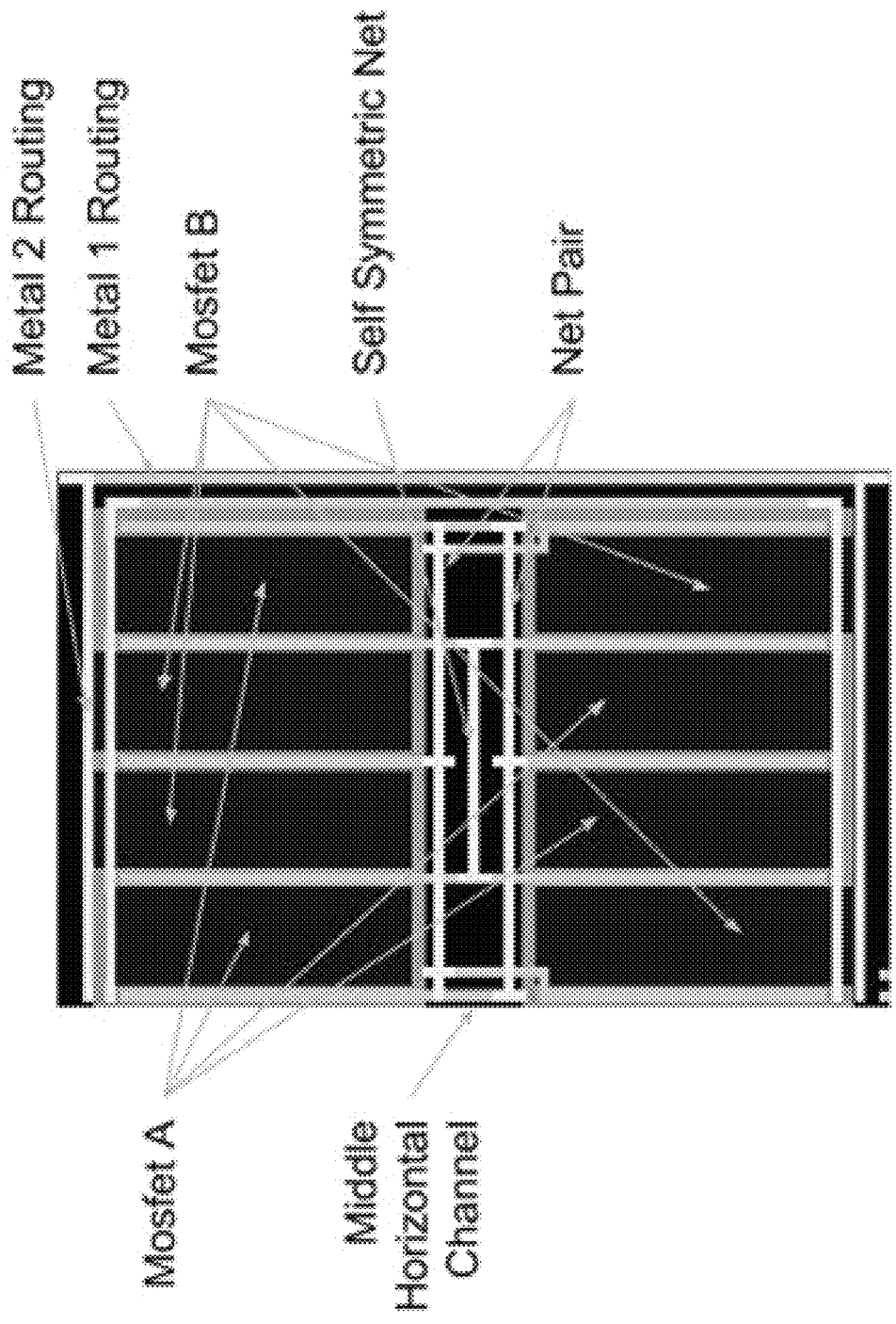
FIG. 20 shows a common centroid two-row blueprint.

FIG. 19 shows a common centroid portfolio flow. FIG. 20 shows a common centroid two-row blueprint.

Referring to FIG. 19, in a step 1902, there are n unplaced and unrouted MOSFETs. In a step 1906, the technique determines row and row positions. In a step 1910, routing patterns are determined. In a step 1914, the technique populates a crystallize layout description. In a step 1918, crystallize is performed. In a step 1923, a crystal is added to a new common centroid blueprint in the portfolio.

1. A single transistor symbol in a schematic can be mapped to the m distinct transistor instances in a layout using a mechanism called m-factor. Each transistor will have the same connectivity as the symbol.

2. The input to the common centroid portfolio is n unplaced and unrouted m-factored MOSFET transistors.

3. The common centroid portfolio generates x common centroid blueprints.

4. Each common centroid blueprint places the transistors in rows.

5. There can be 1, 2, 3, or 4 rows.

6. The architecture allows more rows to be added.

7. The average position of the m-factored transistors with the same schematic symbol is called the centroid.

8. An objective of common centroid layout is for all sets of m-factored transistors to have the same (common) centroid.

9. The r row common centroid blueprint automatically determines a row and row position for all transistors to achieve this objective. This is done by using the following algorithm. For simplicity, this description assumes that there are two m-factor sets, but it is simple to generalize to more.

a. Count the number of transistors in each m-factor set. Let the elements of the first co-factor set be of type A and let there be nA of these elements. Similarly, let the elements of the second m-factor set be of type B and let there be nB of these elements. Our final common centroid should have r rows and c columns.

For example, suppose we have 4A transistors, 8B transistors, and we want to create a 2 row, 6 column common centroid.

b. Scale down the problem by dividing the number of transistors by the highest common factor, h, of nA and nB. That is, our scaled down problem contains nA/h transistors of type A and nB/h transistors of type B.

In our example the highest common factor of 4 and 8 is 4, so our scaled down problem has 4/4=1A transistor and 8/4=2B transistors.

c. Distribute the transistors of the scaled down problem amongst the available number of rows. We do not necessarily have to use all 4 rows at this point, but the number of rows we use should be a factor of r.

In our example, the scaled down solution will be BAB, all on a single row.

d. Duplicate the scaled down solution either vertically or horizontally whilst applying the relevant transformation to maintain the required symmetry. Continue this process until we have r' rows and c' columns, where (2^n)r'=r and (2^m) c'=c for some n and m. The notation "X^Y" in this patent represents exponentiation: X to the power of Y. X is the base and Y is an exponent.

In our example, we will duplicate the solution vertically to give us BAB/BAB. At this point, we have a 2×3 configuration, which meets the termination requirement for this step.

e. Finally we can perform a series of vertical and horizontal reflections of the configuration from step d that will result in a series of configurations all with a common center of gravity, until eventually we reach the desired r row common centroid.

In our example, we perform one reflection which results in the final solution of BABBAB/BABBAB.

10. The user can modify the automatically determined row and row positions using a graphical user interface.

11. The transistors are placed such that the active areas of the transistors form on a uniform grid.

12. If all transistors can contact share, then this is done.

13. The user can override and disable contact sharing.

14. The user can specify the number of dummies placed at the end of each common centroid row.

15. The placement and routing is described in a crystallization Layout Description.

16. For a two row common centroid, the common centroid blueprint generates a matched routing pattern that minimises differences in routing parasitics. This is done using the following algorithm:

a. Nets that are "self symmetric," are recognized. Self-symmetric nets are connected to the same number of pins in the first and second row, and for every pin in the first row, there is a pin in the second row with the same x coordinate. Self symmetric means the pin connectivity of this net to MOSFETs on two rows is perfectly self symmetric. Only such net can be put in the middle of the middle channel without coupling with other net, and it can only be one net normally. First of all, the candidate nets that can be put in the middle channel, should be connecting to both rows. But do not have to be "self symmetric."

i. For each of these nets, an assessment is made to see if they can be connected from the "middle" horizontal routing channel between the rows to the pins of the transistors without interfering with existing common centroid blueprint routing.

ii. If the net passes the assessment, a crystallization Spine and relevant Anchors are added to the Layout Description middle channel.

iii. If the net fails the assessment, a crystallization Spine is created in the routing horizontal channel above the 1st row, in the horizontal channel below the 2nd row, and the vertical channel to the right of the rows, with relevant anchors.

b. Next pairs of nets where for every pin in the first net there is a pin on the second net that has the same x coordinate on the other row. And both nets have the same number of pins.

i. For each of these nets, an assessment is made to see if they can be connected from the "middle" horizontal routing channel between the rows to the pins of the transistors without interfering with existing common centroid blueprint routing.

ii. If the net passes the assessment, a crystallization Spine and relevant Anchors are added to the Layout Description middle channel and positioned topologically such that they positioned symmetric either side of nets recognised in phase a.

iii. If the net fails the assessment, a crystallization Spine is created in the routing horizontal channel above the 1st row, in the horizontal channel below the 2nd row, and the vertical channel to the right of the rows, with relevant anchors.

c. Finally all other nets are considered. For these a crystallization Spine is created in the routing horizontal channel above the 1st row, in the horizontal channel below the 2nd row, and the vertical channel to the right of the rows, with relevant anchors.

17. For one, three and four row common centroid blueprints.

18. Crystallization converts the Layout Description into a Crystal, such that all transistors and routing have coordinates.

Resistor Ladder Instance Constraint Type or Portfolio

Figure 21:
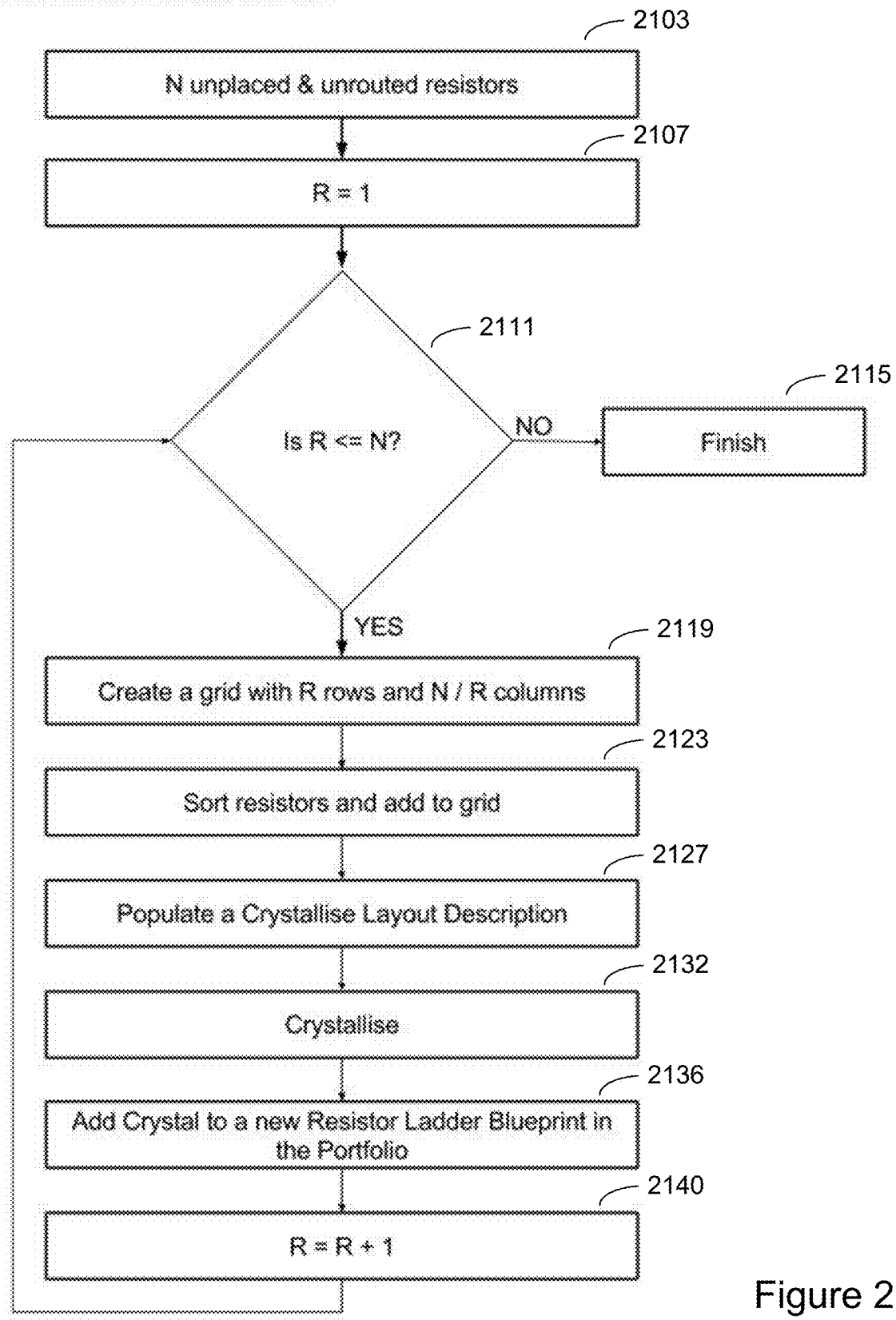
FIG. 21 shows a flow for a resistor ladder portfolio.
Figure 22:
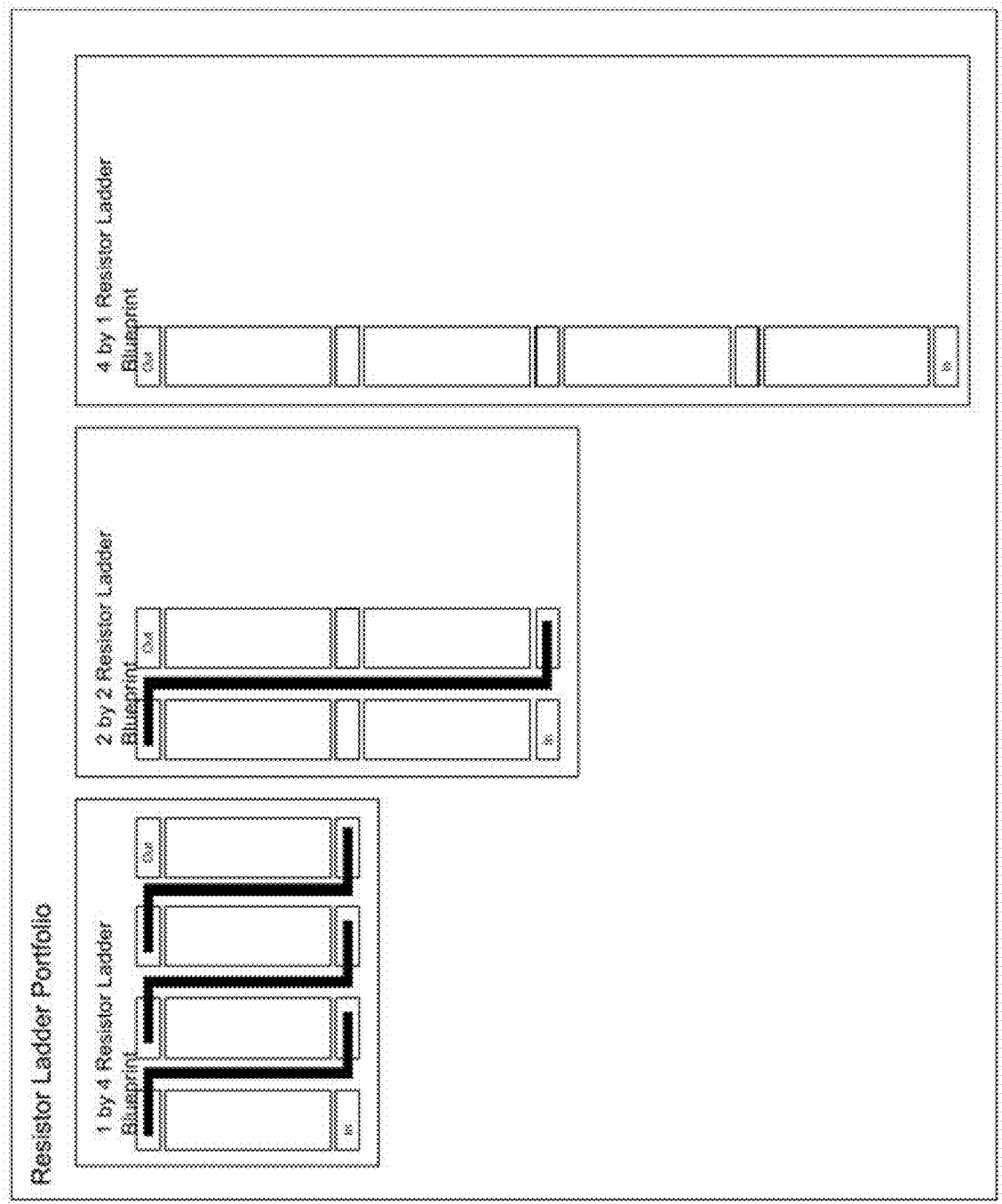
FIG. 22 shows a resistor ladder portfolio and blueprints.
Figure 23:
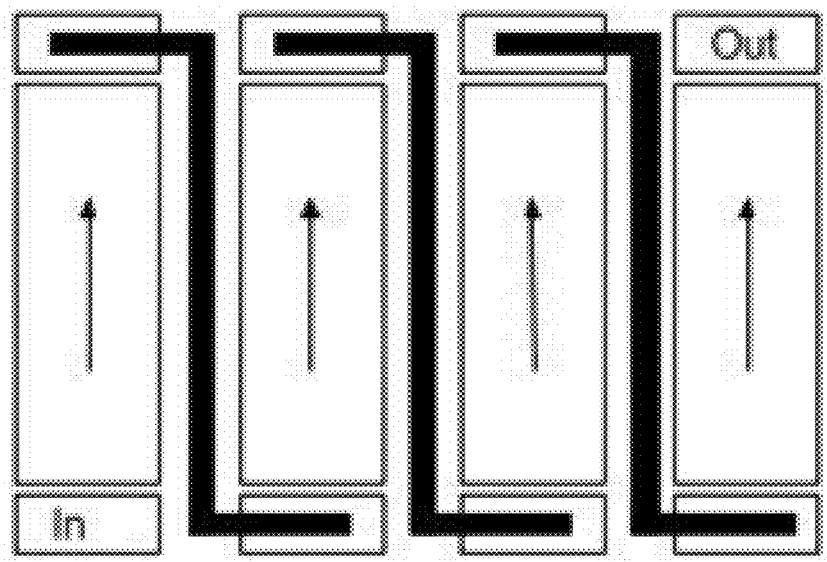
FIG. 23 shows a resistor ladder route back style.
Figure 24:
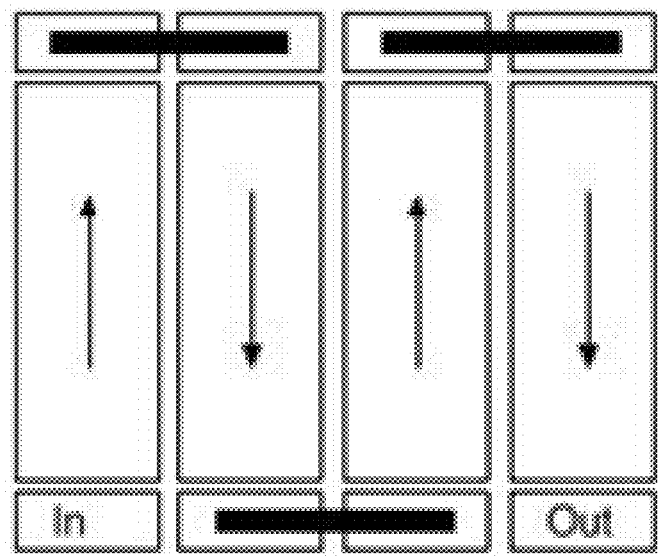
FIG. 24 shows a resistor ladder continuous style.

FIG. 21 shows a flow for a resistor ladder portfolio. FIG. 22 shows a resistor ladder portfolio and blueprints. FIG. 23 shows a resistor ladder route back style. FIG. 24 shows a resistor ladder continuous style.

1. Referring to FIG. 21, in a step 2103, the input to the resistor ladder portfolio is N unplaced and unrouted resistors whose connectivity forms a chain (i.e., the output pin of one resistor is connected to the input pin of the next resistor).

In a step 1207, a parameter R is assigned 1. In a step 1211, the technique determines whether R is less than or equal to N. If no, in a step 2115, the technique finishes. If yes, in a step 2119, the technique continues to create a grid with R rows and N/R columns. In a step 2123, resistors are sorted and added to a grip. In a step 2127, a crystallize layout description is populated. In a step 2132, crystallize is performed. In a step 2136, a crystal is added to a new resistor ladder blueprint in the portfolio. In a step 2140, R is incremented. The flow continues to step 2111, and loops as long as R is less than or equal to N.

2. The resistor ladder portfolio then generates n resistor ladder blueprints.

3. Each resistor ladder blueprint places the resistors on a grid.

4. The blueprints will range from 1 row with m columns through to m rows with 1 column.

5. The resistors are positioned into the grid such that the interconnect length is minimal. There is only one such pattern that achieves this, and can be determined trivially.

6. For any one grid the resistors can be placed in one of two styles "Continuous" or "Route-Back."

7. The Continuous style flips every other resistor such that the routing from the output pin of one resistor to the input pin of the next resistor is minimal length.

8. The Route-Back style places are resistors with the same orientation such that the follow of the current through the resistors is in the same direction, and the S shaped routing is added between the output/input pins.

9. The architecture allows more resistor routing patterns to be added.

10. The placement and routing is described in a crystallization layout description.

11. Crystallization converts the layout description into a crystal, such that all resistors and routing have coordinates.

Capacitor Array Instance Constraint Type or Portfolio

Figure 25:
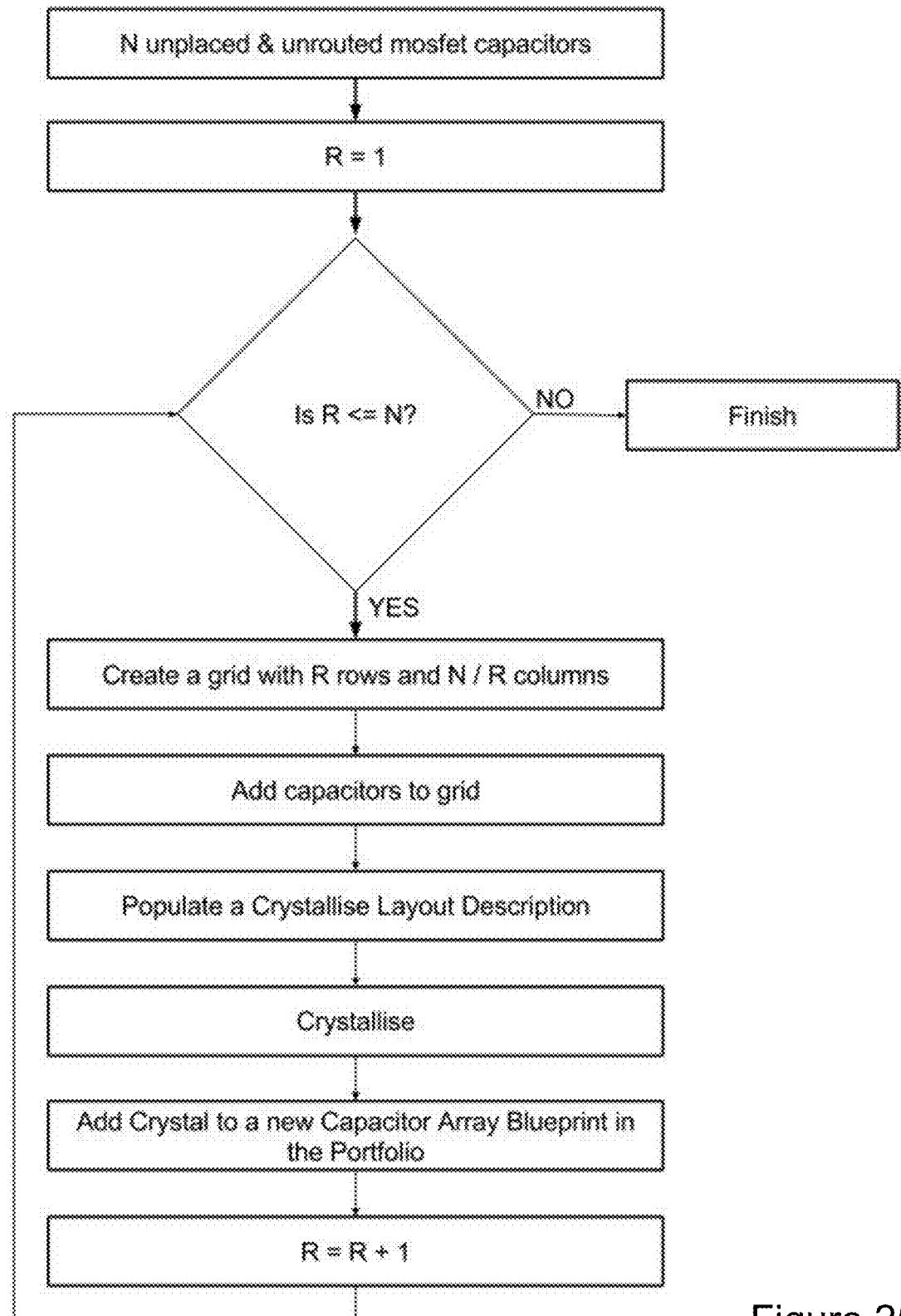
FIG. 25 shows a flow for a capacitor array portfolio.
Figure 26:
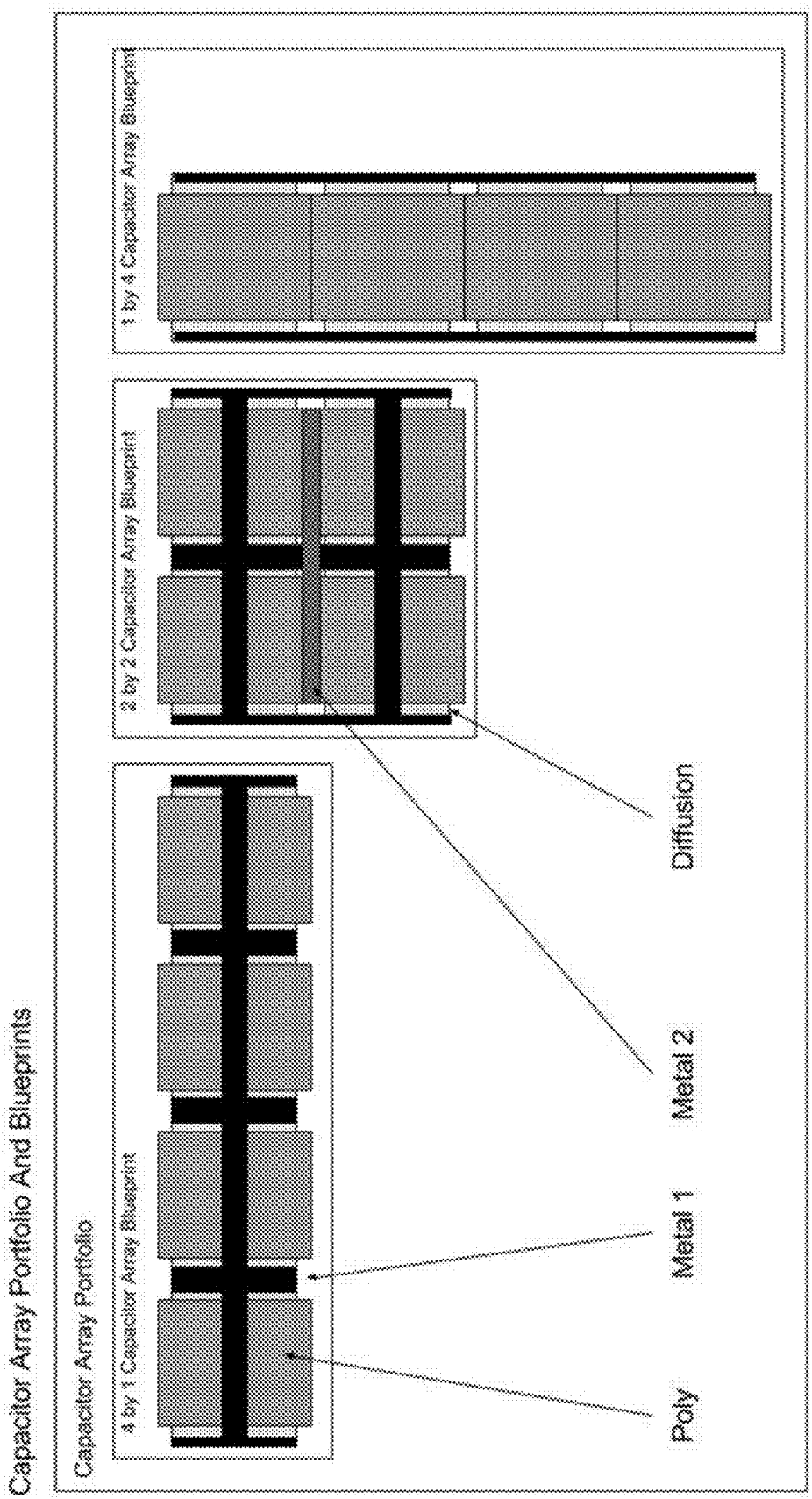
FIG. 26 shows a capacitor array portfolio and blueprints.

FIG. 25 shows a flow for a capacitor array portfolio. The flow for the capacitor array portfolio is similar to the flow for the resistor array portfolio described above. FIG. 26 shows a capacitor array portfolio and blueprints.

1. The input to the capacitor array portfolio is n unplaced and unrouted MOSFET capacitors whose source and drain pins are on a common net, and the gate pins are on a second common net.

2. The capacitor array portfolio then generates n capacitor array blueprints.

3. Each capacitor array blueprint places the capacitors on a grid.

4. The blueprints will range from 1 row with m columns through to m rows with 1 column, for every permutation that avoids having an empty cell in the grid.

5. As each capacitor has identical connectivity, the capacitors can be positioned into the grid in an arbitrary order.

6. The capacitors are routed such that there is a regular mesh of routing connecting all pins together.

7. The placement and routing is described in a crystallization layout description.

8. Crystallization converts the layout description into a crystal, such that all capacitors and routing have coordinates.

MOSFET Grid Instance Constraint Type or Portfolio

Figure 27:
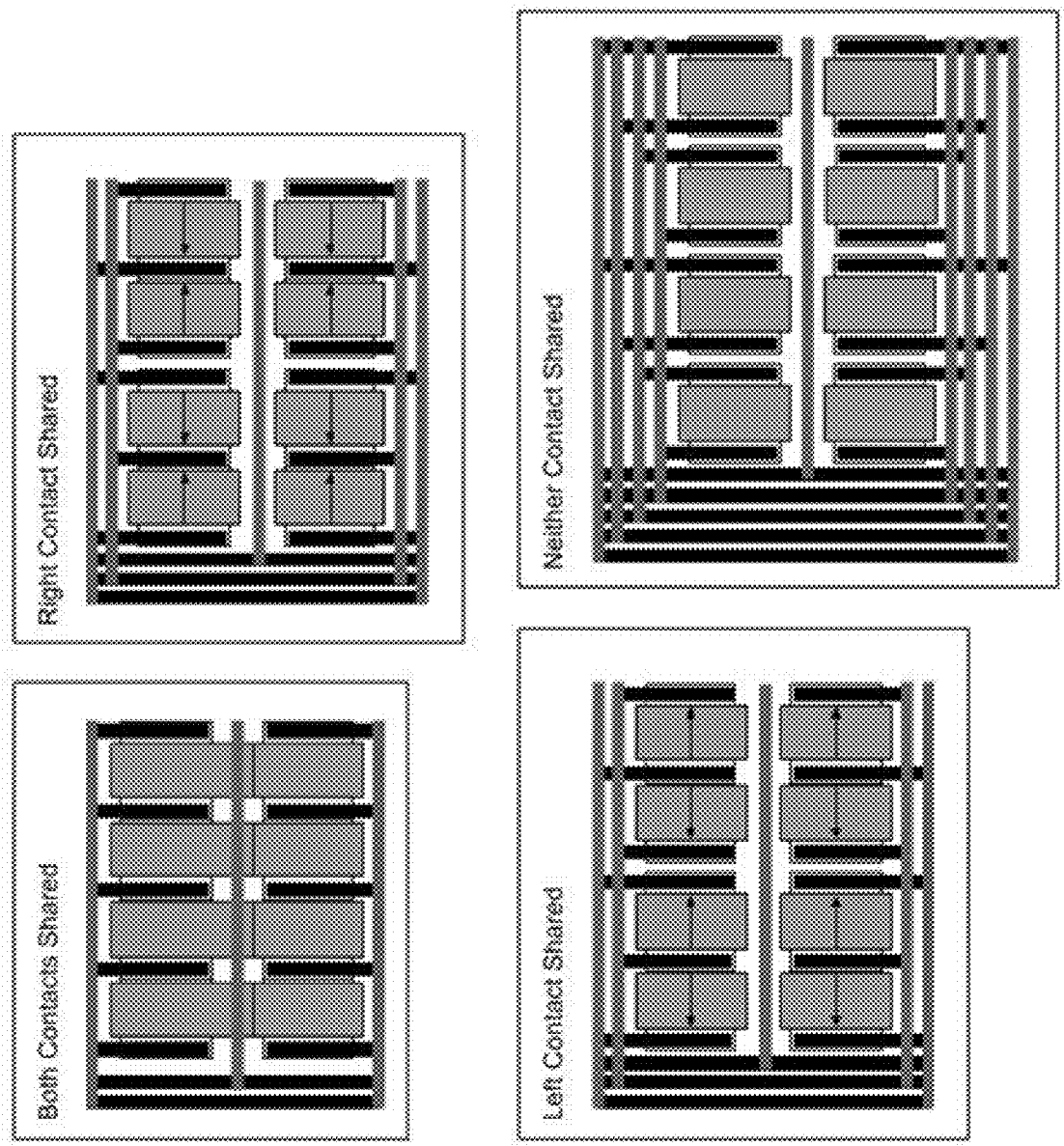
FIG. 27 shows placement patterns for a MOSFET grid portfolio.

FIG. 27 shows placement patterns for a MOSFET grid portfolio. FIG. 28 shows a MOSFET grid portfolio and blueprints.

1. The input to the MOSFET grid portfolio is n identically parameterized unplaced and unrouted MOSFET transistors.

2. The MOSFET grid portfolio then generates n MOSFET grid blueprints.

3. Each MOSFET grid blueprint places the transistors on a grid.

4. The blueprints will range from 1 row with m columns through to m rows with 1 column.

5. Along each row, one of four placement patterns will be used: "Both Contacts Shared," "Right Contact Shared," "Left Contact Shared," "Neither Contact Shared."

6. For any given blueprint, the placement pattern will be identical for each row.

7. The MOSFET grid blueprint will determine if the transistors can be ordered along the rows such that all adjacent transistors have the same net on the nearest source/drain pin. If so the "Both Contacts Shared" pattern is used, and all transistors will be placed such that a contact is shared.

8. Otherwise the MOSFET grid will determine if the transistors can be ordered along the rows such that pairs of transistors have a common net on the nearest source/drain pin. This may require flipping some transistors. If so either the Right Contact Shared or Left Contact Shared pattern is used, and the pairs of transistors will be placed such that a contact is shared. Note that with this pattern the blueprint must have an even number of transistors in a row.

9. Otherwise the Neither Contact Shared pattern is used, and the no transistors contact share.

10. The placement and routing is described in a crystallization Layout Description.

11. Horizontal spines will be added in the crystallize routing channels between the rows.

12. The spines on the horizontal channels will be on the first metal routing layer.

13. The even horizontal routing channels are used for the nets connected to the source and drain pins 14. The odd horizontal routing channels are used for the nets connected to the gate pins.

15. Vertical spines will be added in the crystallize routing channel to the left of the rows. These will connect the horizontal spines together on the second metal routing layer.

16. Crystallization converts the layout description into a crystal, such that all transistors and routing have coordinates.

Row Region Instance Constraint Type or Portfolio

Figure 29:
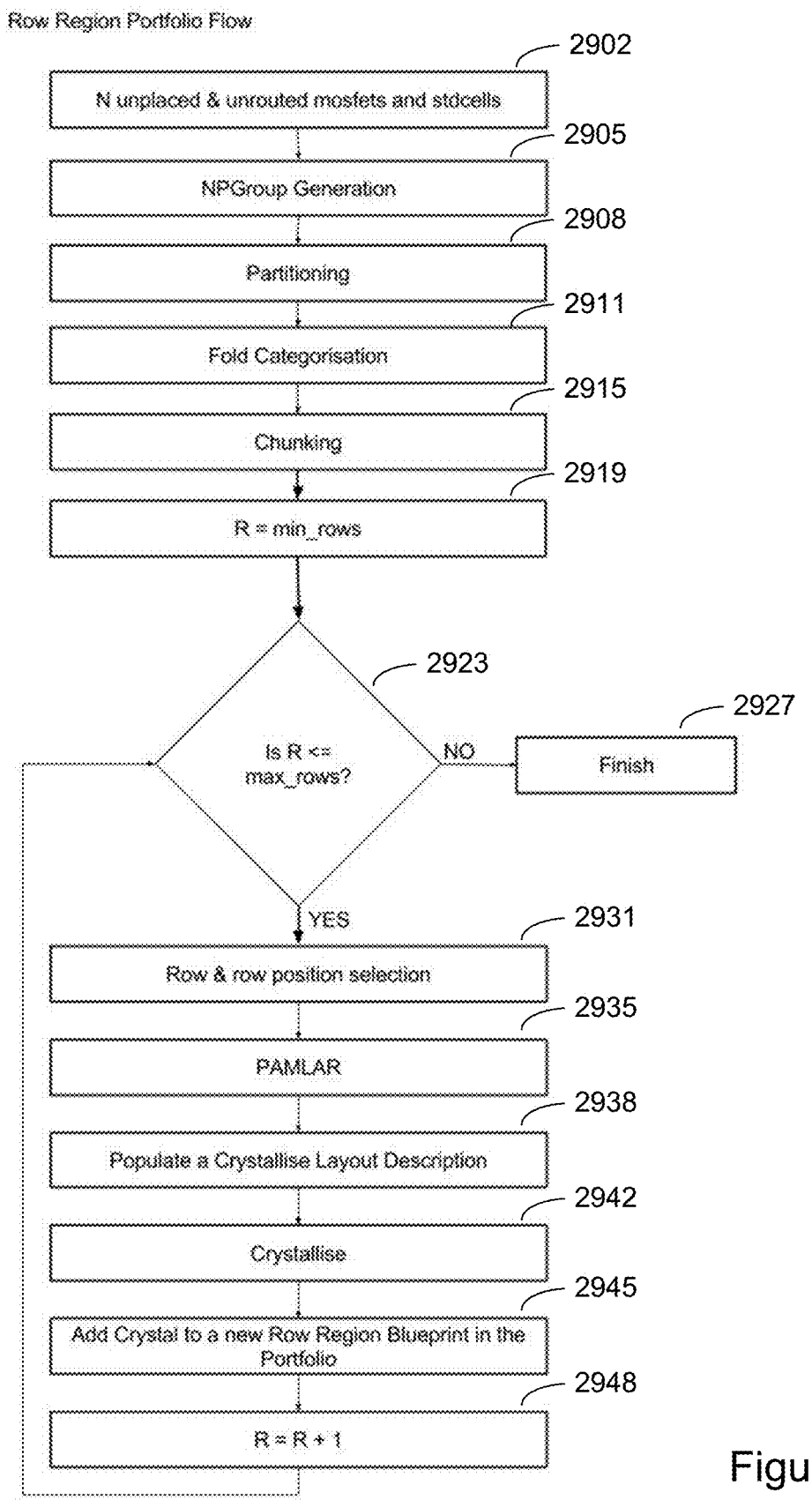
FIG. 29 shows a flow for a row region portfolio.
Figure 30:
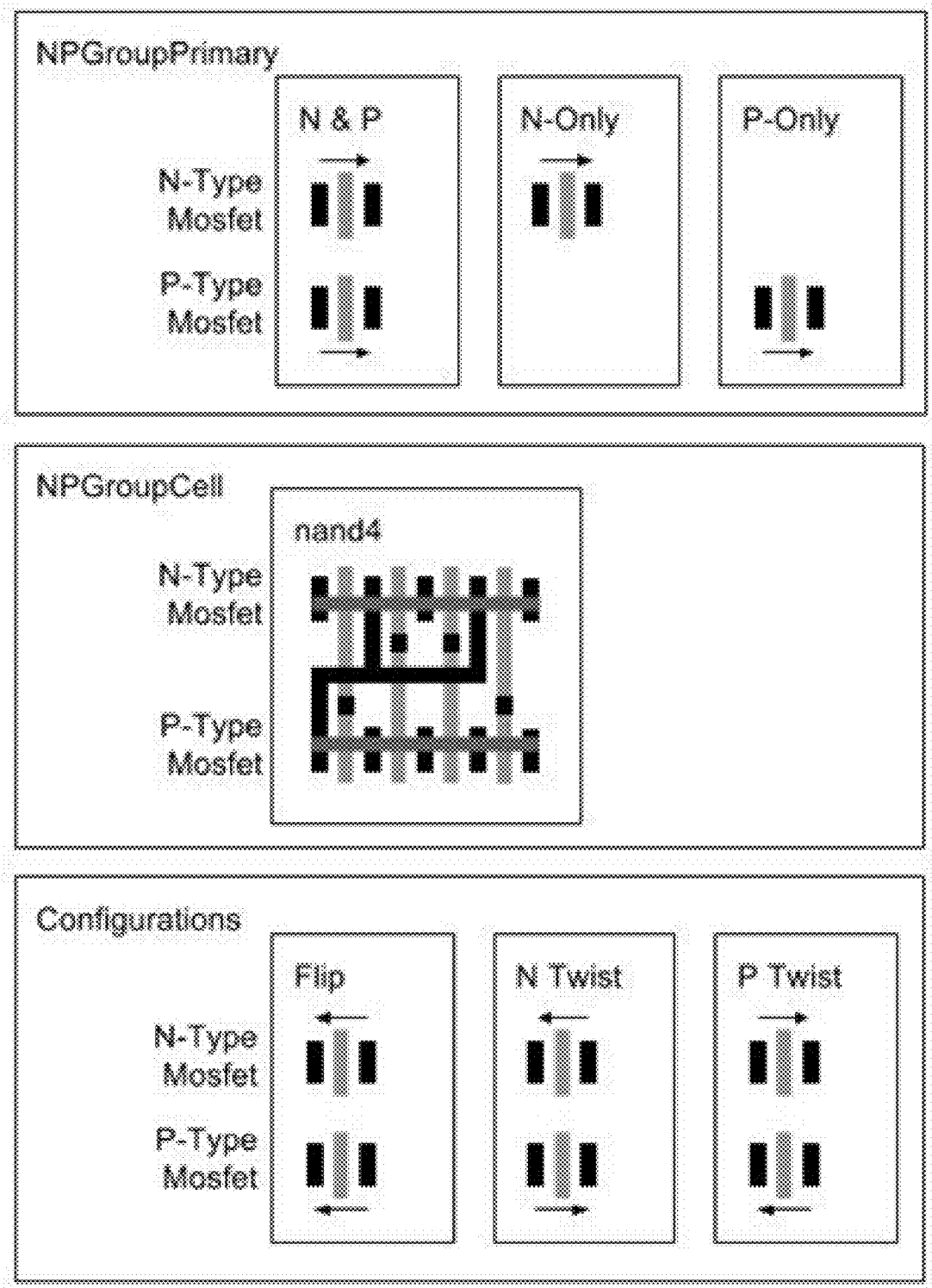
FIG. 30 shows a row region NPGroup configurations.
Figure 32:
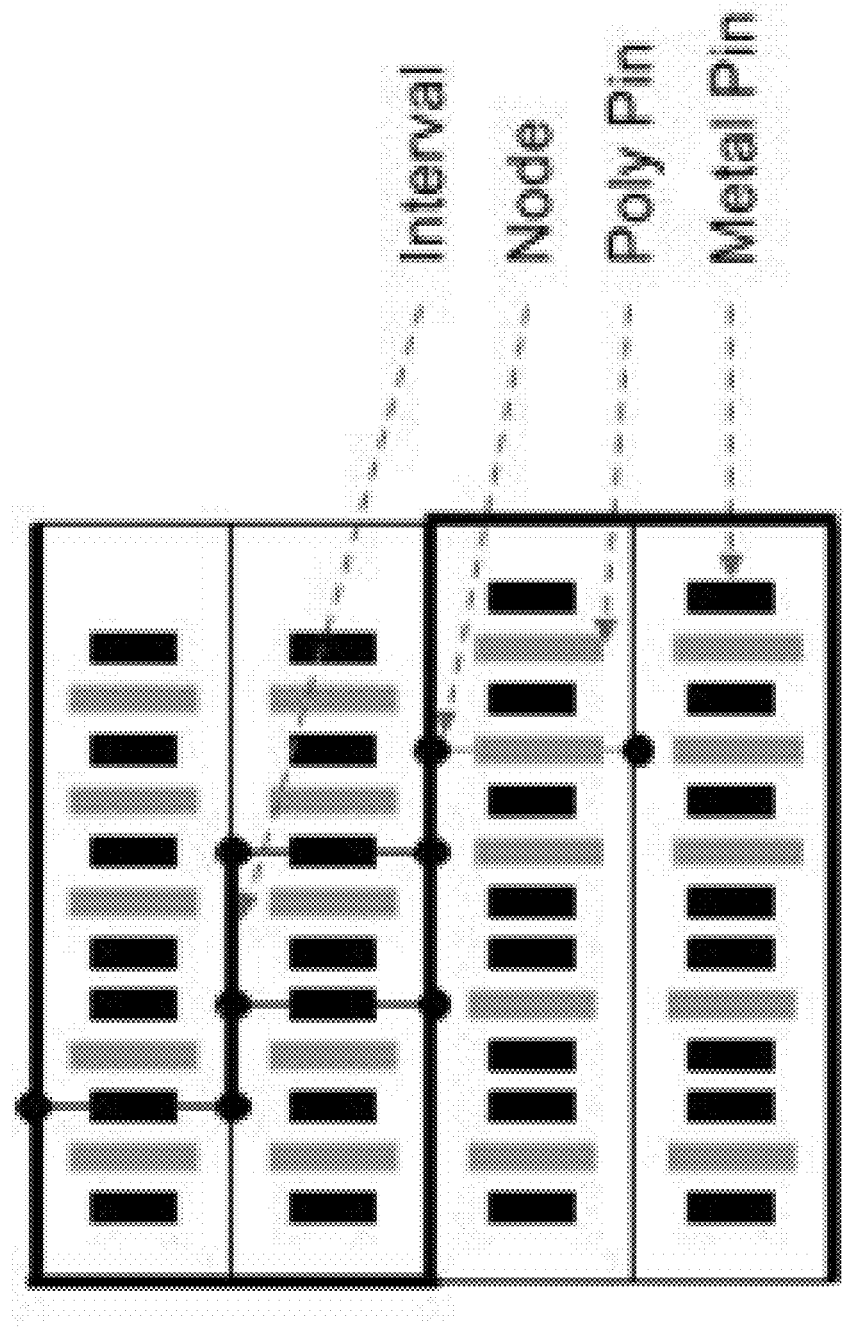
FIG. 32 shows a PAMLAR 4 pin net initial QSolution.
Figures 33A, 33B:
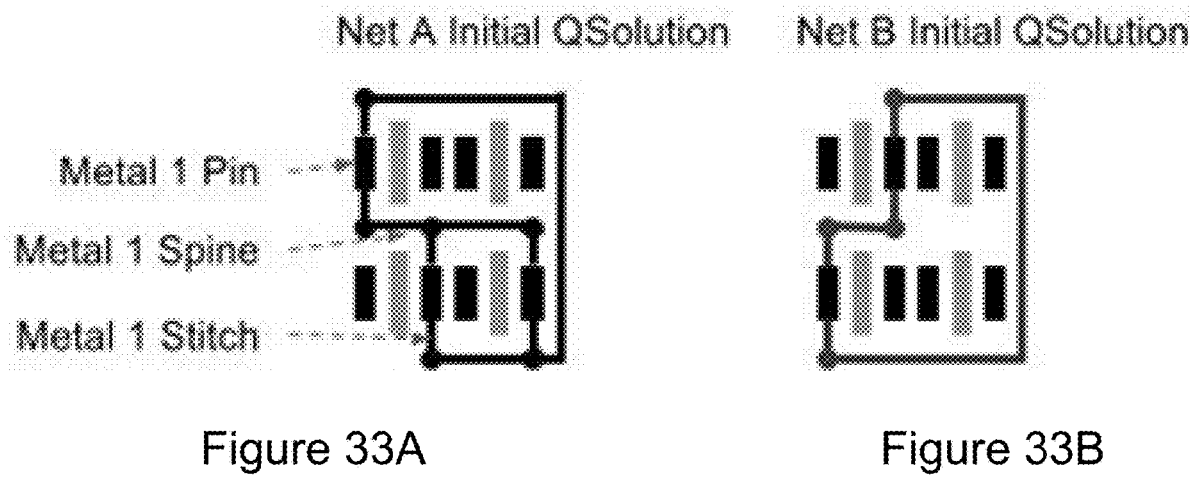
FIGS. 33A-33C show a PAMLAR 2 net QSolution set.
Figure 33C:
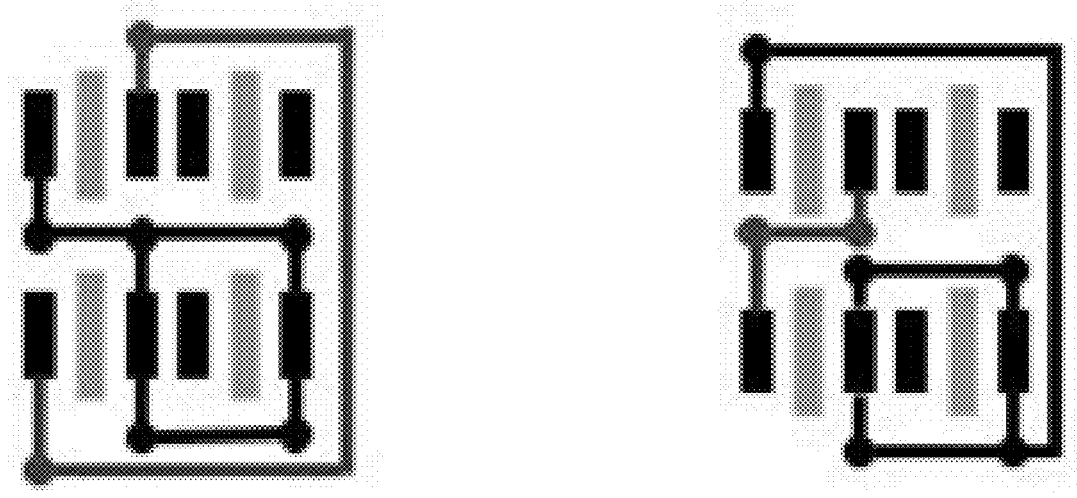
Figure 34:
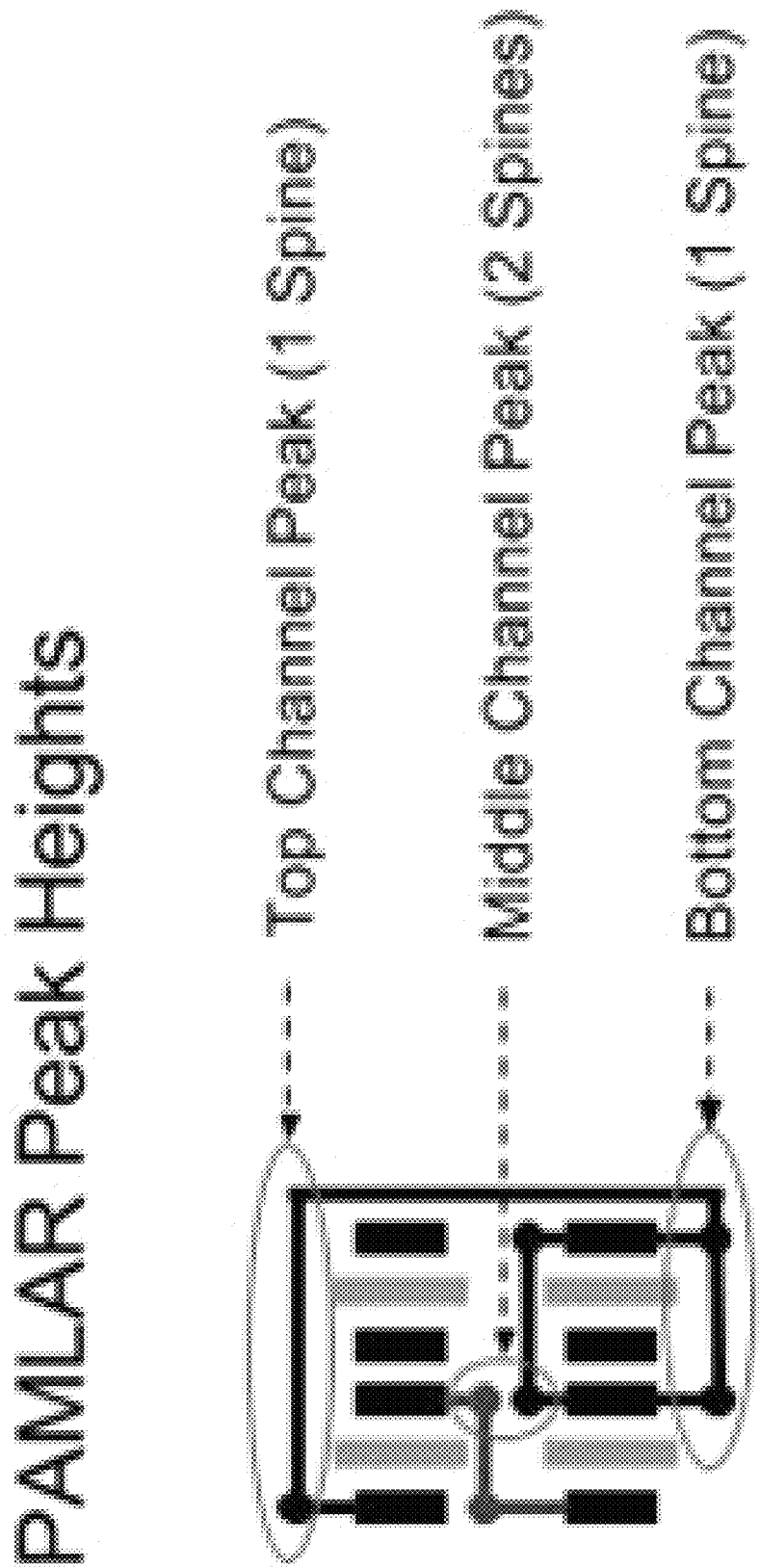
FIG. 34 shows a PAMLAR peak heights.

FIG. 29 shows a flow for a row region portfolio. FIG. 30 shows a row region NPGroup configurations. FIGS. 31A-31B shows a row region NPGroup partitioning. FIG. 32 shows a PAMLAR 4 pin net initial QSolution. FIGS. 33A-33C show a PAMLAR 2 net QSolution set. FIG. 34 shows a PAMLAR peak heights.

Referring to FIG. 29, in a step 2902, there are N unplaced and unrouted MOSFETs and standard cells. In a step 2905, NPGroup generation is performed. In a step 2908, partitioning is performed. In a step 2911, fold categorization is performed. In step 2915, chunking is performed. In a step 2919, the variable R is assigned to a value min_rows.

In a step 2923, the technique termines whether R is less than or equal to a value max_rows. If no, in a step 2927, the technique finished. If yes, in a step 2031, the technique continues to tow and row position selection.

In a step 2935, PALMAR is performed. In a step 2938, a crystallize layout description is populated. In a step 2942, crystallize is performed. In a step 2945, a crystal is added to a new row region blueprint in the portfolio. In a step 2948, R is incremented. The flow continues to step 2923, and loops as long as R is less than or equal to max_rows.

1. The input to the Row Region Portfolio is 0 or more MOSFET transistors, which may be constrained by an np alignment constraint, and 0 or more standard cells.
    a. The input transistors may have different parameterizations.
    b. The input transistors may be a mixture of n-type and p-type MOSFETs.
    c. An np alignment constraint restricts the placement of 1 n-type MOSFET and 1 p-type MOSFET such that their gates are vertically aligned.
2. The instances are converted into a set of "NPGroup." Initially an NPGroup is either:
    a. An "NPGroupPrimary", which contains 1 unconstrained n-type MOSFET, or 1 unconstrained p-type MOSFET, or a np alignment constraint which contains 1 n-type MOSFET and 1 p-type MOSFET.
    b. Or, an "NPGroupCell" which contains a standard cell.
3. The set of NPGroup are partitioned into a hierarchy of smaller sets of NPGroup using the following process:
    a. The set of NPGroup are partitioned by mutual row compatibility.
        i. Two instances are mutually row compatible if they can be placed on the same row with the same separation between the n well and the p well.
        ii. A standard cell has fixed separation between its n well and p well.
        iii. Two unconstrained np alignment constraints are always row compatible.
        iv. A standard cell instance, and an np alignment constraint are row compatible.
        v. Two standard cell instances that have different well separations within them are not row compatible.
    b. The set of NPGroup are further partitioned by hierarchical name, such that instances that are from the same flattened cell are grouped together.
    c. The set of NPGroup are further partitioned by MOSFET parameterization, such that same size instances are grouped together.
    d. The set of NPGroup are further partitioned by np alignment constraints, such that n type MOSFETs are grouped, p type MOSFETs are grouped, and np alignment constraints are grouped.
    e. Finally the set of NPGroup are further partitioned by connectivity using branch and bound and Fiduccia-Mattheyses hypergraph partitioning algorithms such that no partition contains more than X NPGroups.
4. If there are multiple possible foldings of the MOSFETs, we attempt to create "fold categories." A fold category contains a folding of each MOSFET such that the widths are matched as closely as possible. Later, when we place the MOSFETs on a row, we will use the fold categories in order to reduce area.
5. The hierarchy of NPGroup are then placed into K "Chunks." A Chunk is a subset of the NPGroup from the hierarchy that are topological placed along a single row. The Chunk is stored in a new composite NPGroup type called an "NPGroupSecondary." This process is referred to as "Chunking", and proceeds as follows:
    a. A depth first iteration of the partitioning hierarchy levels determined in step 3 is performed.
    b. At the lowest level of the hierarchy, the number of NPGroups are counted.
    c. If the number of NPGroups is less than or equal to K then chunking at this level terminates.
    d. NPGroups are merged together to form one large NPGroupSecondary. The NPGroupSecondary contains an ordered set of child NPGroups, placed horizontally on a row. The objective of the ordering of the child NPGroups is to minimizing the width of NPGroupSecondary. The width of the NPGroupSecondary is calculated by placing adjacent NPGroups as close as DRC rules allow, which includes contact sharing when viable. To determine the best order the algorithm attempts to consider all permutations of NPGroup order, NPGroup flip and NPGroup twist using branch and bound. It is entirely possible that the branch and bound will 'timeout' because the number of NPGroups is greater than K, and it has consider too many permutations. In which case the smallest width permutation is recorded, and the non-optimal result will be mitigated by the repeated merge and splitting process that chunking performs.
    e. The NPGroupSecondary is now split into K sub NPGroupSecondarys. The splitting is performed by repeatedly finding the biggest horizontal gap between adjacent child NPGroups in the input NPGroupSecondary, and splitting that NPGroupSecondary at that point into two new sub NPGroupSecondarys.
    f. Chunking then proceeds to the next level up in the hierarchy, and repeats steps b to e. The Chunking terminates at the root level of the hierarchy with K NPGroups.
6. The Row Region Portfolio then generates Y row region blueprints.
7. A Row Region Blueprint places instances on rows.
8. Within a row, the n-type MOSFETs (including those within standard cells) are aligned by their diffusion shapes.
9. Within a row, the p-type MOSFETs (including those within standard cells) are aligned by their diffusion shapes.
10. Row Region Blueprints will be generated for 1 to Z rows.
11. The objective of each Row Region Blueprint is to minimize area.
12. The width of the Row Region Blueprint can be minimized by maximizing the amount of contact sharing along each row, and minimizing large MOSFET to MOSFET separations caused by DRC rules.

13. For multiple rows, the width of the Row Region Blueprint can be minimized by minimizing the width of the widest row.

14. The height of the Row Region Blueprint can be minimized by minimizing the number coincident parallel routing segments between the rows.

15. For multiple rows, the height of the Row Region can be minimized by minimizing the difference in instance height on any one row.

16. The Row Region Blueprint determines a row and row position for each instance.

17. For single row Row Region Blueprints, the following is done:

a. All permutations of order, flip and twist of the K NPGroups created by chunking are considered using a branch and bound algorithm.

b. The branch and bound algorithm minimizes area.

c. The height factor of area is determined by considering the peak number of overlapping parallel spines that will be required to route the NPGroups together. It is noted that the height of the NPGroups is constant with respect to order, and therefore is removed from the calculation.

18. For multiple row Row Region Blueprints, the following is done:

a. Each possible permutation of the NPGroups can be converted into a multi-row placement. To achieve this, the given permutation is iterated over, and each NPGroup is appended to the current shortest row. During this process, NPGroups will be flipped or twisted as necessary to take advantage of possible contact sharing.

b. A branch and bound algorithm will be applied to minimize the area of all these solutions.

c. Further optimization can be applied because some NPGroups can be incompatible and are not allowed to exist on the same row. Let X and Y be two such groups, and suppose that in the current placement there is no row that both X and Y could be appended to. Then the order that these two groups are added in doesn't matter and we can skip one of the permutations.

d. When there are multiple possible foldings of the transistors that are being placed, then we consider the different foldings in parallel. Each row in each solution in the branch and bound problem now contains a variation for each possible folding. The area of a solution is determined by a heuristic which picks the best possible combination of rows.

19. Once the topological order of each instance has been determined (i.e. its row and row position), the topological placement is topologically routed using a routing algorithm called "Poly and Metal Layer Auto Router (PAMLAR)."

a. It is observed that for a given net there are a limited number of topological solutions for a horizontally compact row based placement when the net is routed on the same layers as the transistors. Each net can route horizontally between the rows, row to row vertically at either the start or end of the rows, and vertically into the pins.

b. For each net, PAMLAR enumerates the limited number of topological solutions in a per net object referred to as a "QSolution."

c. A QSolution stores the data with a memory efficient "Node" array. Each Node states a pin, and how it is connected to the Node to the right in the array. The value if this can be: NONE, POLY, METAL_1_UNBIASED, METAL_2_BIASED, or METAL_BOTH.

d. Using these values PAMLAR can consider routing nets in poly and the first two metal layers.

e. A QSolution always represents a set of mutually legal topologically solutions.

f. At this point a QSolutions is storing the mutually legal topological solutions for a single net. And as all solutions for a net are topologically legal against each other, there is a single QSolution for a single net.

g. Next the two QSolutions are "Smashed" against each other to produce F QSolutions, each of which contains a set of mutually legal solutions, but now for two nets. The Smashing process minimizes F, i.e. each QSolution contains as many mutually legal solutions as possible.

h. QSolutions which contain opens (i.e. pins that are no longer connected in the Node array) are pruned from the set of QSolutions.

i. Step f to g is repeated until all net level QSolutions have been Smashed. The loop terminates with a set of QSolutions that contain all mutually legal fully routed solutions for all nets.

j. At this point the QSolutions are pair-wise mutually legal. I.e. Node A is mutually legal with Node B, and Node B is mutually legal with Node C. But Node A, B & C might not be all mutually legal. The algorithm now removes such solutions.

k. The algorithm next picks a topological routing path for each net from the set of QSolutions. In their current state we cannot observe the quality of each QSolution as it represents multiple different topological routing paths, so picking the solution with the smallest area, or shortest routing length, or other metrics is non-trivial.

l. The algorithm proceeds by first minimizing area. This is done by observing that, although in a topological space where the size of the routing is not yet determined, the area that we can influence is dominated by the height of routing that is parallel and coincident in a channel. The nets that pass through the current peak height are considered for removal in turn, each permutation being considered in a new separate QSolution if it can be done without introducing an open.

m. Next the algorithm minimizes total routing length. This is done by observing that, although in a topological space where the size and length of the routing is not yet determined, the length of each net can be minimized in isolation to all other nets. And for each net the x separation between pins is known, therefore we can minimize the net length by using a Prims style algorithm, removing the longest interval first as long as that interval does not introduce any opens. Secondly we can minimize the net length further by removing redundant stitches from pins to spines. This phase will terminate with each net in each QSolution not containing any rings. By minimizing the individual net length for each net, we have minimized the total net length.

n. Finally, from the set of minimal area ring free QSolution we pick a single QSolution, and extract the topological routing paths from the Node chains.

20. The topological placement, and topological routing paths are added to a crystallization layout description.

21. Crystallization converts the layout description into a crystal, such that all transistors and routing have coordinates.

Subcircuit Symmetry Instance Constraint Type or Portfolio

Figure 35:
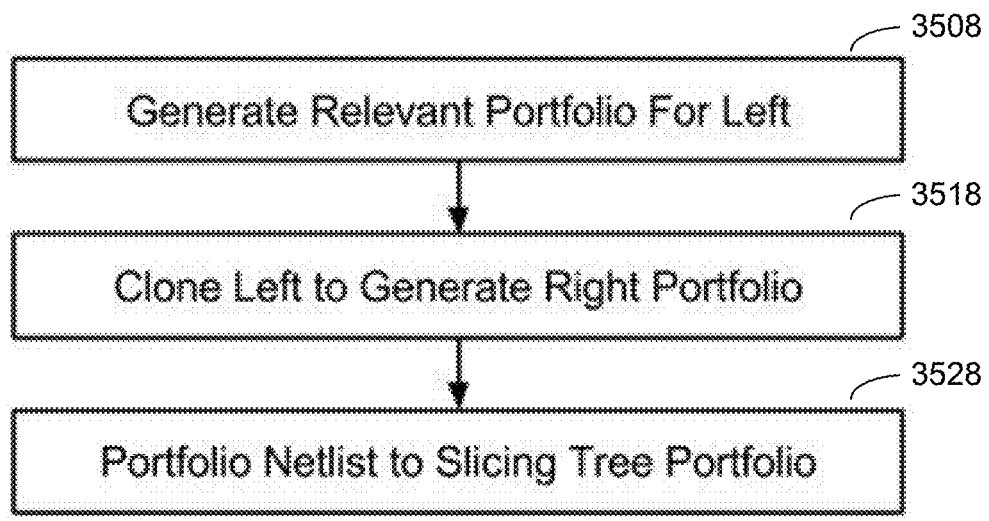
FIG. 35 shows a subcircuit symmetry portfolio flow.

FIG. 35 shows a subcircuit symmetry portfolio flow.

1. The input to the Subcircuit Symmetry Portfolio is a left and right child.

2. The left child contains S Animate constraints, e.g. a Row Region Constraint.

3. The right child also contains S Animate constraint types, that mirror the constraints in the left child. Further any instance within the right child constraint subtree has an equivalent instance in an equivalent constraint in the left child.

4. In a step 3508, the Subcircuit Symmetry Portfolio generates a crystallize layout description for the left child, using the appropriate Portfolio types as described elsewhere.

5. In a step 3518, the left crystallize layout description is then "cloned." The cloning process copies the layout description and replaces the instances and nets in the copy with their equivalents for the right child. In a step 3528, the portfolio netlist is added to a slicing tree portfolio.

6. Crystallization converts the left layout description into a left crystal, such that all left instances and routing have coordinates.

7. Crystallization converts the right layout description into a right crystal, such that all right instances and routing have coordinates.

8. The right Crystal is then flipped.

9. A subcircuit symmetry blueprint contains the left and right crystal.

10. The routing between the left and right crystal are routed using STAR.

11. The left and right Crystal and STAR topological routing is added to a crystallization layout Description.

12. Crystallization converts the layout description into a crystal, such that all instances and routing have coordinates.

Subcircuit Match Instance Constraint Type or Portfolio

Figure 36:
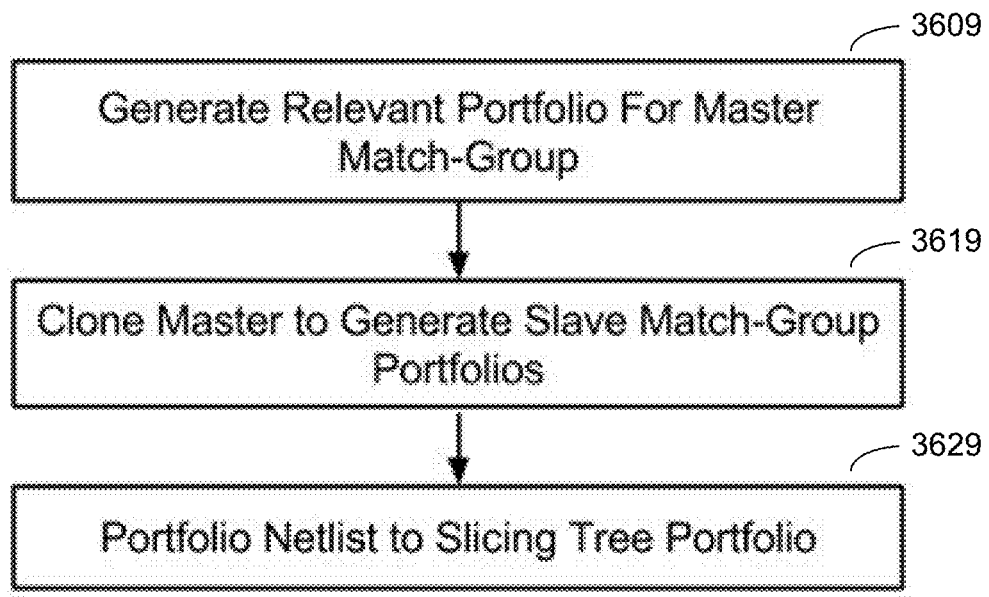
FIG. 36 shows a subcircuit match portfolio flow

FIG. 36 shows a subcircuit match portfolio flow

1. The input to the Subcircuit Match Portfolio is M children.

2. The first child contains O Animate constraints (e.g. a Row Region Constraint).

3. All other children also contains O Animate constraint types, that mirror the constraints in the left child. Further any instance within the mth child constraint subtree has an equivalent instance in an equivalent constraint in the first child.

4. In a step 3609, the Subcircuit Match Portfolio generates a Crystallize Layout Description for the first child, using the appropriate Portfolio types as described elsewhere.

5. In a step 3619, the first Crystallize Layout Description is then "Cloned" M-1 times. The Cloning process copies the Layout Description and replaces the instances and nets in the copy with their equivalents for the mth child. In a step 3629, the portfolio netlist is added to a slicing tree portfolio.

6. Crystallization converts the all child Layout Descriptions into a Crystals, such that all child instances and routing have coordinates.

7. The child Crystals are then placed using DeFer as described elsewhere.

8. A Subcircuit Match Blueprint contains the placed child Crystals.

9. The routing between the child Crystals is routed using STAR.

10. The child Crystal and STAR topological routing is added to a Crystallization Layout Description.

11. Crystallization converts the Layout Description into a Crystal, such that all instances and routing have coordinates.

Align Instance Constraint Type or Portfolio

1. The input to the Align Portfolio is zero or more child Animate constraints and zero or more child instances.

2. The Align Portfolio starts by generating the relevant Portfolio for each of the child constraints and child instances.

3. The Align Portfolio then generates n Align Blueprints.

4. Each Align Blueprint places the child constraints and child instances on a vertical column or horizontal row.

5. The Align Blueprint uses a Slicing Tree that is restricted to just vertical or just horizontal cuts.

6. The Align Blueprint Slicing Trees are generated by a restricted version of the DeFer algorithm, referenced elsewhere, generating a curve of solutions that consider the different permutations of the child Portfolio Blueprints.

7. The user can set a property to specify whether the child constraints should be placed horizontally, vertically or both.

8. The user can set a property to specify whether the child constraints should be placed in the order set by the user, or ordered by the algorithm using the DeFer wirelength optimisation technique.

9. The Align Blueprint Slicing Tree is then topologically routed using STAR.

10. The Alignment Blueprint Slicing Tree and STAR topological routing paths are added to a Crystallize Layout Description.

11. Crystallization converts the Layout Description into a Crystal, such that all instances and routing have coordinates.

Cell Grid Portfolio

1. The input to the Cell Grid Portfolio is one or more instances.

2. Each instance has the same master design.

3. The Cell Grid Portfolio generates n Cell Grid Blueprints.

4. Each Cell Grid Blueprint places the instances in a grid.

5. The blueprints will range from 1 row with n columns through to n rows with 1 column.

6. The instances are positioned in the grid by determining an unique row and column for each instance such that the half perimeter wirelength (HPWL) is minimised.

7. HPWL is minimised by repeatedly bi-partitioning the instances and minimising the cut cost formed by the hypergraph of the instance connectivity, using a branch and bound hypergraph partitioning algorithm.

8. Once a row and column has been determined, the grid is converted into a Slicing Tree and routed by STAR.

9. The Slicing Tree and STAR topological routing paths are added to a Crystallize Layout Description.

10. Crystallization converts the Layout Description into a Crystal, such that all instances and routing have coordinates.

Worked Example: Circuit and Layouts

Figure 37:
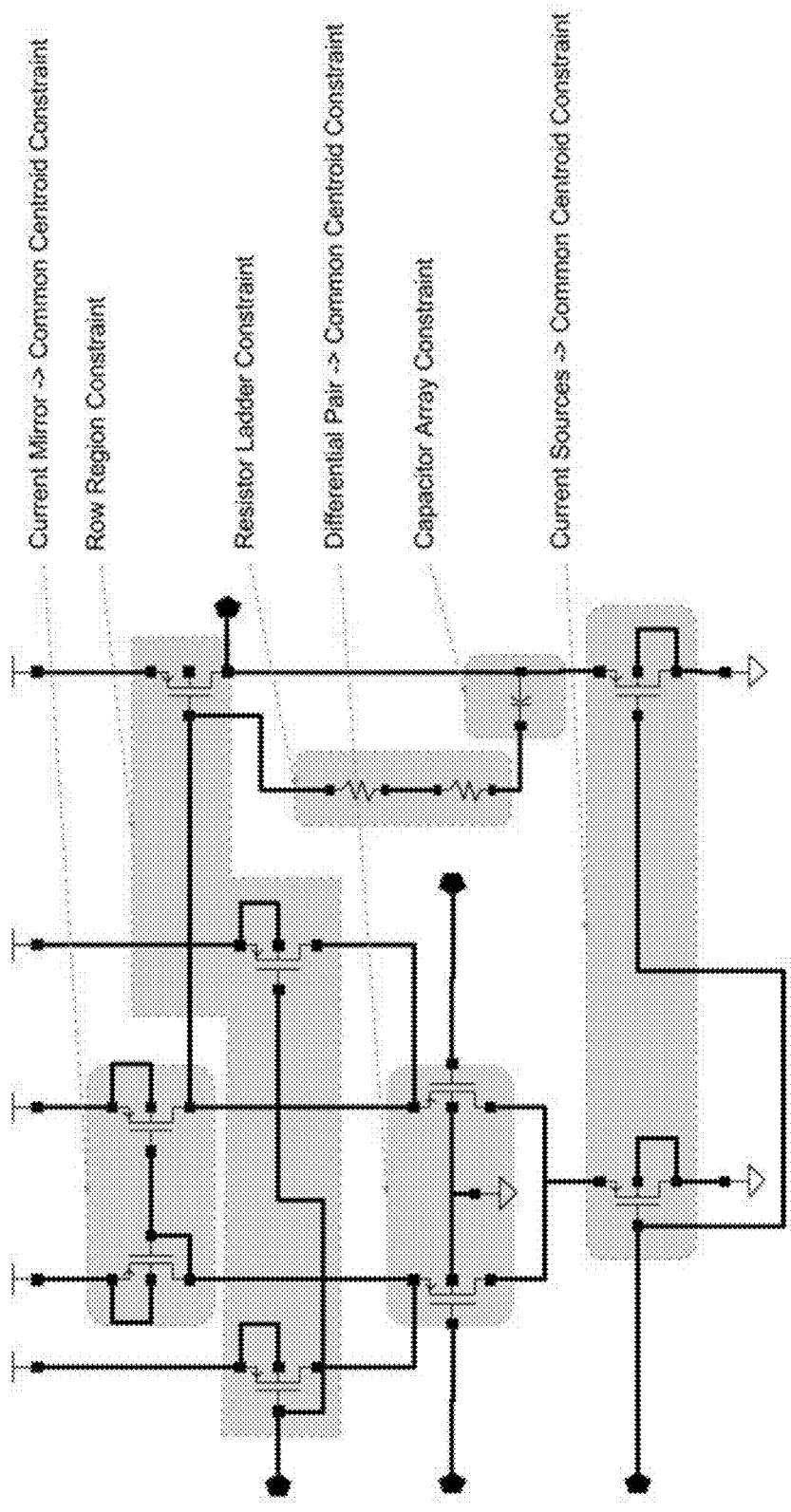
FIG. 37 shows a worked example op amp circuit.
Figure 38:
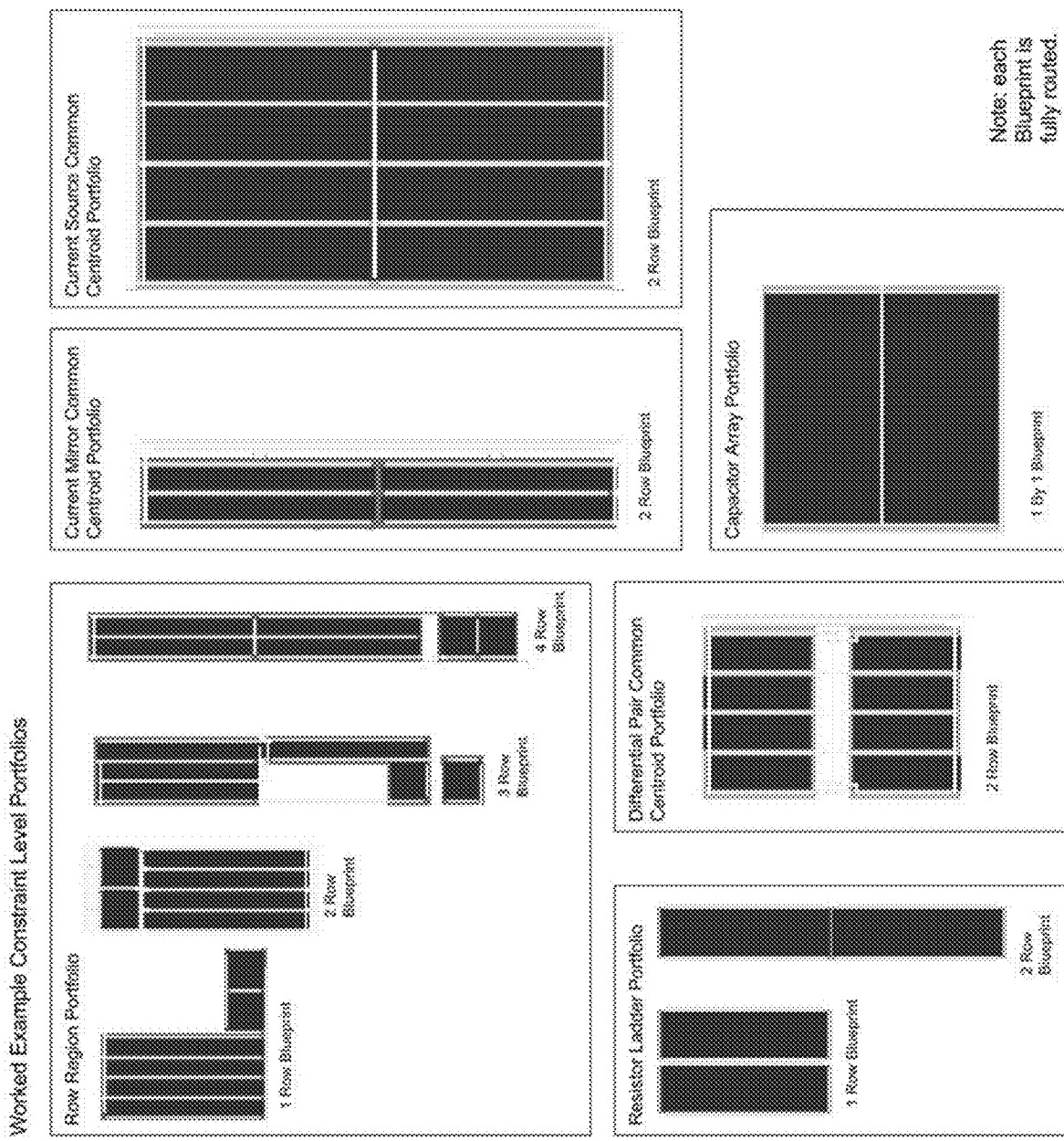
FIG. 38 shows a worked example constraint level portfolios.
Figure 39:
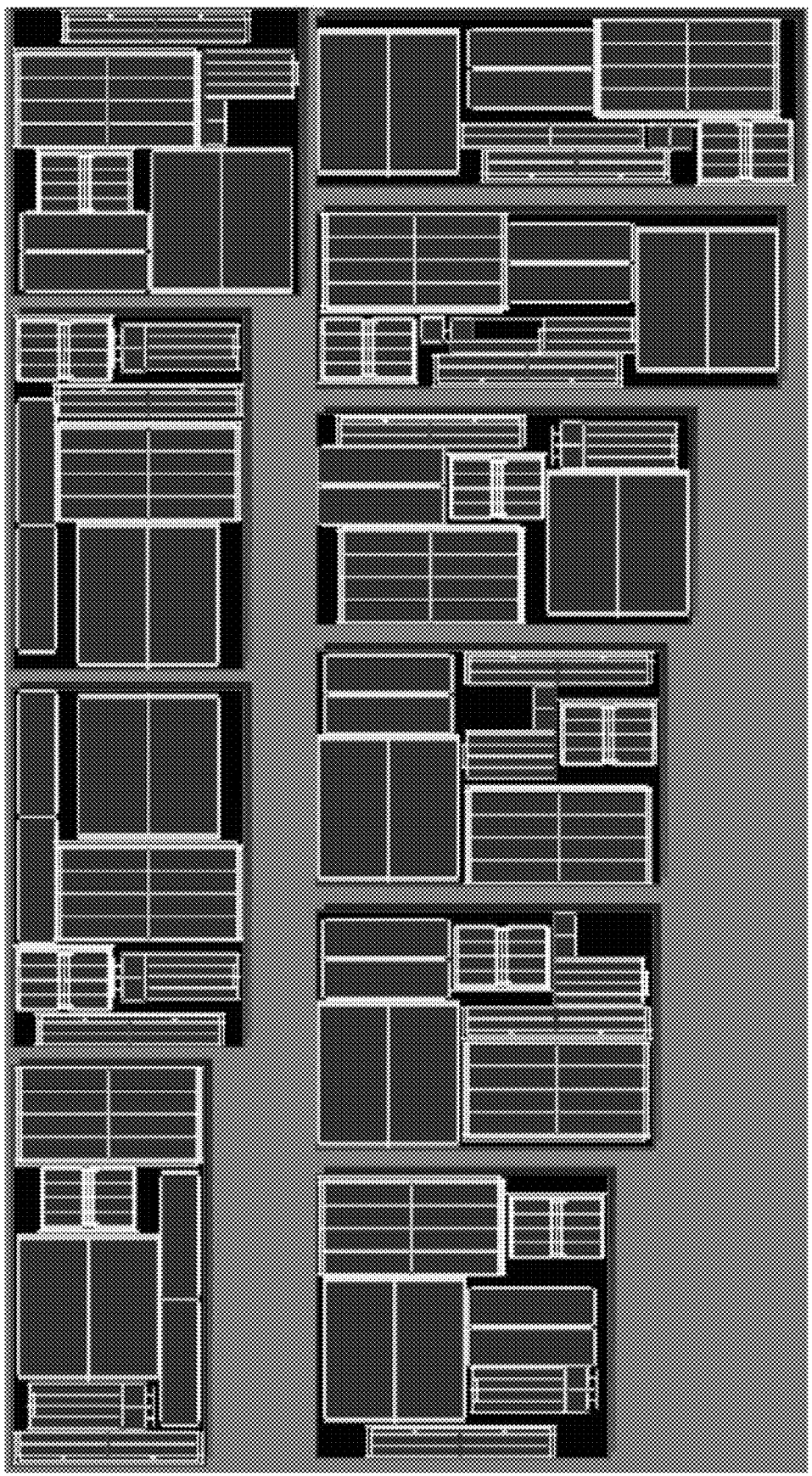
FIG. 39 shows worked example curve of slicing tree of blueprints.
Figure 40:
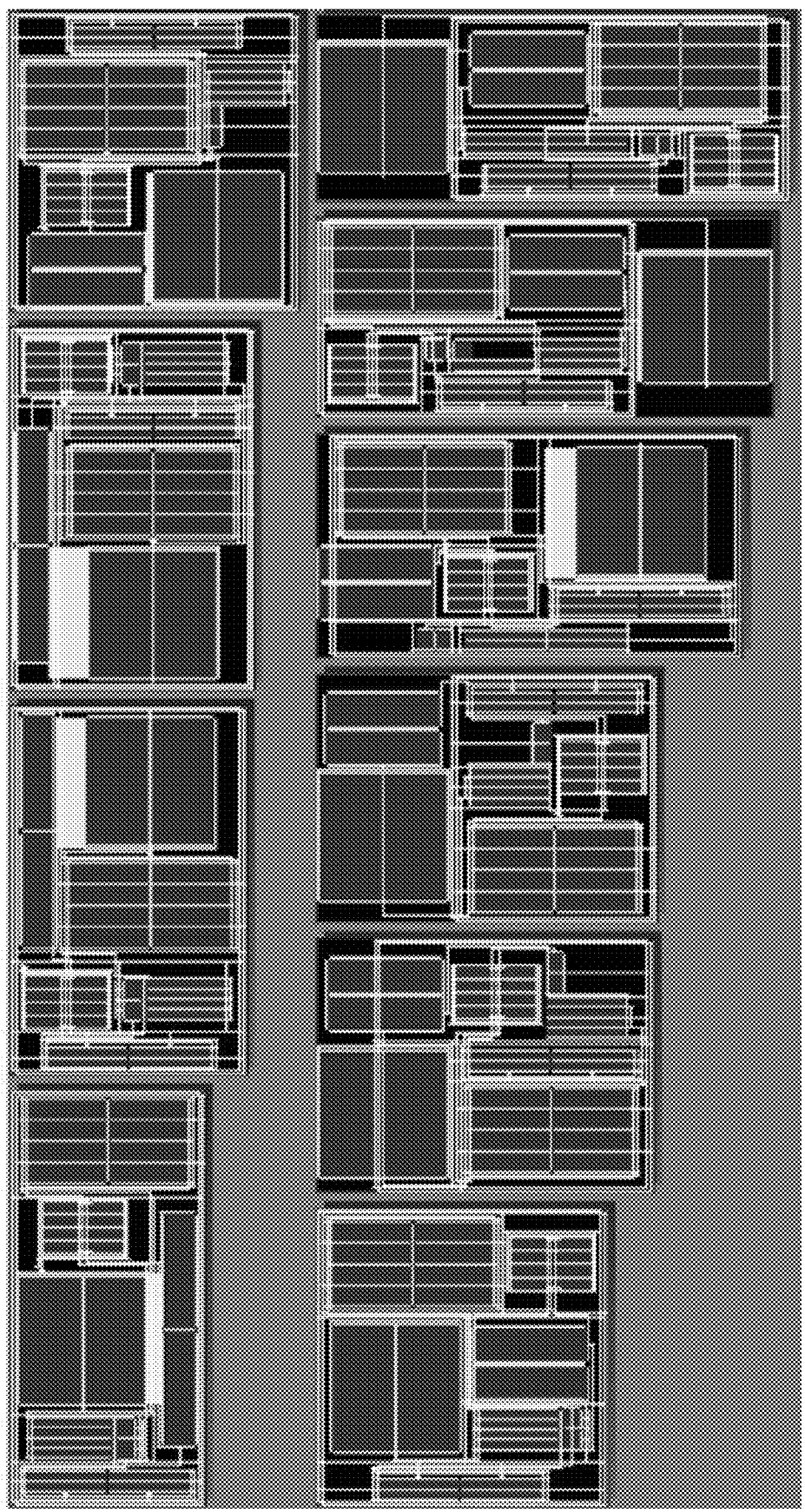
FIG. 40 shows a worked example slicing tree portfolio.

FIG. 37 shows a worked example op amp circuit. FIG. 38 shows a worked example constraint level portfolios. FIG. 39 shows worked example curve of slicing tree of blueprints. FIG. 40 shows a worked example slicing tree portfolio.

1. Constraint recognition:

a. Detects the current mirror and generates a common centroid constraint.

b. Detects a differential pair and generates a common centroid constraint.

c. Detects current sources and generates a common centroid constraint.

d. Detects the resistors and creates a resistor ladder constraint.

e. Detects a capacitor and creates a capacitor array constraint.

f. And Detects some MOSFETs and creates a row region constraint.

2. The relevant portfolios are generated for each constraint:

a. The Common Centroid Portfolio generates a single two row Common Centroid Blueprint for the current mirror.

b. The Common Centroid Portfolio generates a single two row Common Centroid Blueprint for the differential pair.

c. The Common Centroid Portfolio generates a single two row Common Centroid Blueprint for the current sources.

d. The Resistor Ladder Portfolio generates a 2×1 and a 1×2 Resistor Ladder Blueprint.

e. The Capacitor Array Portfolio generates a single 1×1 Capacitor Array Blueprint.

f. The Row Region Portfolio generates a 1 row, 2 row, 3 row and 4 row Blueprint.

3. The adapted DeFer algorithm generates a curve of Slicing Trees containing the Blueprints from the Portfolios.

4. STAR is run on each Slicing Tree.

5. Each Slicing Tree is added to a Crystallize Layout Description, along with the STAR topological routing paths.

6. Crystallization converts the Layout Description into a Crystal, such that all instances and routing have coordinates.

7. The Crystal forms a Slicing Tree Blueprint, that is added to the Slicing Tree Portfolio.

8. The Slicing Tree Portfolio is displayed to the user.

One-Hundred Percent Routing Guarantee

PolyMorphic Layout can guarantee that each layout it generates is 100 percent routed, with 0 opens and 0 shorts, as long as the input passes some preconditions. The preconditions are as follows:

1. There should be at least two metal routing layers. One metal routing layer will be used for vertical routing (typically metal 1), and the other metal routing layer will be used for horizontal routing (typically metal 2).

2. There should be a via, or set of vias, that traverses the layers from the first metal routing layer to the second metal routing layer.

3. There should be a via, or set of vias, that traverse the layers from at least one pin of every terminal of every input design (parameterised cells or static cells) to the first or second metal routing layer.

4. Animate should be able to mutually route out of each terminal of each input design (parameterised cells or static cells) to the first or second metal routing layer.

a. PolyMorphic Layout makes this assessment using an algorithm referred to as the "Pin Escape Router." For designs that have less than seventeen common direction terminals, the Pin Escape Router tries every permutation of straight-line routing from each terminal in west, south, east, and north directions in combination with every other terminal. The straight-line routing will include the necessary vias, placed as close as possible to the terminal, to traverse to the required metal routing layer. Note that the via location also has the benefit of minimizing poly routing. If there is a mutually legal permutation for all terminals then the precondition passes.

PolyMorphic Layout then guarantees 100 percent routing by:

1. Each Blueprint ensures that the connectivity that is internal to the Blueprint is fully routed. Each Blueprint can do this because biased routing is used on the two metal routing layers and either:

a. The placement is not fixed (e.g., the horizontal channel between N and P devices in a Row Region Blueprint), and therefore can be changed to allow the routing to fit (e.g., the exact gap in the Row Region Blueprint example being chosen by Crystallization after PAMLAR).

b. The placement is fixed (for example routing into a parameterized cell), but precondition (4) has passed so at least one mutually legal escape pattern is known, and therefore used.

The Blueprint ensures the algorithm that is deployed to perform the routing cannot fail.

2. Each Blueprint ensures that nets within the Blueprint that have connectivity outside of the Blueprint can be mutually Punctured at least once on either the west, south, east, or north side on the first or second metal routing layer. There are various schemes that be used:

a. Puncture Concurrent which allocates a single known Puncture for each external net, which is used as a "last resort," and then performs "on the fly" Puncturing which attempts to minimize routing lengths and will be used in preference as long as they are mutually legal with the last resort.

b. Rupture Punctures which allocate a set of mutually legal Punctures for each external net.

3. Finally the top level Slicing Tree Portfolio places pins using the Puncture information from (2) above so that precondition (4) passes for the generated layout. Thus the 100 percent routing guarantee can be maintained up through the levels of a hierarchical circuit.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
importing a first circuit schematic in a first format;
creating a first netlist from the first circuit schematic;
using an electronic processor, automatically generating constraints for the first netlist, wherein the automatically generating constraints comprises
providing a plurality of predefined patterns for a plurality of constraints,
reviewing the first netlist and identifying patterns in the first netlist that correspond to the predefined patterns, and
when a predefined pattern is identified in the first netlist, using a constraint that is associated with that predefined pattern as one of the automatically generated constraints for the first netlist;
creating a second netlist by flattening the first netlist;
importing a layout in a second format associated with the second netlist;
generating parameterized cells associated with the second netlist; and
using the parameterized cells, generating one or more placed and routed layouts to obtain a polymorphic layout.

2. The method of claim 1 wherein a predefined pattern comprises at least one of a current mirror circuit, current mirror with differential pair circuit, a MOSFET capacitor, an operational amplifier circuit, a CMOS transmission gate, or a CMOS tristate inverter.

3. The method of claim 1 wherein the generating one or more placed and routed layouts to obtain a polymorphic layout comprises multiple placed and routed layouts.

4. The method of claim 1 comprising:
providing a graphical user interface comprising a first window and a second window;
in the first window, displaying the first circuit schematic for a first circuit; and
in the second window, displaying the one or more placed and routed layouts for the first circuit in the first window.

5. The method of claim 1 wherein the generating one or more placed and routed layouts to obtain a polymorphic layout comprises multiple placed and routed layouts, and the method comprises:

providing a graphical user interface comprising a first window and a second window;

in the first window, displaying the first circuit schematic for a first circuit; and in the second window, displaying the multiple placed and routed layouts of the first circuit schematic, wherein each layout is an implementation of the first circuit comprising internal routing.

6. A method comprising:

importing a first circuit schematic in a first format;

creating a first netlist from the first circuit schematic;

automatically generating constraints for the first netlist, wherein the automatically generating constraints comprises:

providing a plurality of predefined patterns for a plurality of constraints, reviewing the first netlist and identifying patterns in the first netlist that correspond to the predefined patterns, and when a predefined pattern is identified in the first netlist, using a constraint that is associated with that predefined pattern as one of the automatically generated constraints for the first netlist;

creating a second netlist by flattening the first netlist;

importing a layout in a second format for parameterized cells associated with the second netlist;

evaluating the parameterized cells; and generating one or more placed and routed layouts to obtain a polymorphic layout, wherein the generating comprises creating at least one layout corresponding to the first circuit schematic.

7. The method of claim 6 wherein a predefined pattern comprises at least one of a current mirror circuit, current mirror with differential pair circuit, a MOSFET capacitor, an operational amplifier circuit, a CMOS transmission gate, or a CMOS tristate inverter.

8. The method of claim 6 wherein the generating one or more placed and routed layouts to obtain a polymorphic layout comprises multiple placed and routed layouts.

9. The method of claim 6 comprising:

providing a graphical user interface comprising a first window and a second window;

in the first window, displaying the first circuit schematic for a first circuit; and in the second window, displaying the one or more placed and routed layouts for the first circuit in the first window.

10. The method of claim 6 wherein the generating one or more placed and routed layouts to obtain a polymorphic layout comprises multiple placed and routed layouts, and the method comprises:

providing a graphical user interface comprising a first window and a second window;

in the first window, displaying the first circuit schematic for a first circuit; and in the second window, displaying the multiple placed and routed layouts for the first circuit in the first window.

11. A method comprising:

providing a graphical user interface comprising a first window and a second window;

in the first window, displaying a first circuit schematic for a first circuit;

in the second window, displaying a plurality of layouts for the first circuit in the first window, wherein each layout is a complete implementation of the first circuit comprising internal routing;

generating a first layout of the plurality of layouts, wherein the first layout is rectangular and comprises an X length and Y width; and generating a second layout of the plurality of layouts, wherein the second layout is rectangular and comprises an X length and Y width, and relative to the first layout, structures and a routing of the second layout are arranged differently from and not in a mirror image of those for the first layout.

12. The method of claim 11 comprising:

generating a third layout of the plurality of layouts, wherein the third layout is rectangular and comprises Y length and X width.

13. The method of claim 11 comprising:

allowing a user to select one of the plurality of layouts for the first circuit as a layout in an integrated circuit design comprising the first circuit.

14. A method comprising:

providing a graphical user interface comprising a first window and a second window;

in the first window, displaying a first circuit schematic for a first circuit;

creating a first netlist from the first circuit schematic;

automatically generating constraints for the first netlist, wherein the automatically generating constraints comprises:

providing a plurality of predefined patterns for a plurality of constraints, reviewing the first netlist and identifying patterns in the first netlist that correspond to the predefined patterns associated with the constraints, and when a predefined pattern is identified in the first netlist, using the constraint associated with that predefined pattern as one of the automatically generated constraints for the first netlist;

using the first netlist, generating a plurality of layouts for the first circuit based on the automatically generated constraints for the first netlist;

in the second window, displaying the plurality of layouts for the first circuit in the first window, wherein each layout is a complete implementation of the first circuit comprising internal routing;

generating a first layout of the plurality of layouts, wherein the first layout is rectangular and comprises an X length and Y width; and generating a second layout of the plurality of layouts, wherein the second layout is rectangular and comprises an X length and Y width, and relative to the first layout, structures and a routing of the second layout are arranged in a mirror image of those for the first layout.

15. The method of claim 14 comprising:

generating a third layout of the plurality of layouts, wherein the third layout is rectangular and comprises Y length and X width.

16. The method of claim 15 comprising:

generating a fourth layout of the plurality of layouts, wherein the fourth layout is rectangular and comprises Y length and X width, and relative to the third layout, structures and a routing of the fourth layout are arranged in a mirror image of those for the third layout.

17. The method of claim 14 comprising:
allowing a user to select one of the plurality of layouts for the first circuit as a layout in an integrated circuit design comprising the first circuit.

18. The method of claim 17 wherein the mask comprises at least the layout of the plurality of layouts for the first circuit that was selected by the user.

19. The method of claim 17 wherein the integrated circuit formed comprises at least the layout of the plurality of layouts for the first circuit that was selected by the user.

20. The method of claim 14 wherein each layout comprises a transformation of the first circuit schematic into a layout for semiconductor manufacture via photolithography.

* * * * *